United States Patent
Wallaert et al.

(10) Patent No.: US 8,802,981 B2
(45) Date of Patent: Aug. 12, 2014

(54) FLUSH WALL MOUNT THERMOSTAT AND IN-SET MOUNTING PLATE FOR A HEATING, VENTILATION AND AIR CONDITIONING SYSTEM

(75) Inventors: Timothy Wallaert, Wylie, TX (US); Timothy H. Thorson, McKinney, TX (US); Thomas G. Pavlak, Commerce Township, MI (US)

(73) Assignee: Lennox Industries Inc., Richardson, TX (US)

( * ) Notice: Subject to any disclaimer, the term of this patent is extended or adjusted under 35 U.S.C. 154(b) by 822 days.

(21) Appl. No.: 12/603,534

(22) Filed: Oct. 21, 2009

(65) Prior Publication Data
US 2010/0101854 A1  Apr. 29, 2010

Related U.S. Application Data

(63) Continuation-in-part of application No. 12/258,659, filed on Oct. 27, 2008.

(60) Provisional application No. 61/167,135, filed on Apr. 6, 2009.

(51) Int. Cl.
| | | |
|---|---|---|
| H01H 9/02 | (2006.01) |
| H01H 13/04 | (2006.01) |
| H01H 19/04 | (2006.01) |
| H01H 21/04 | (2006.01) |
| H01H 23/04 | (2006.01) |
| H01H 13/46 | (2006.01) |
| H02G 3/16 | (2006.01) |
| H01R 13/502 | (2006.01) |
| H05K 7/02 | (2006.01) |
| G06F 1/00 | (2006.01) |
| H05K 5/00 | (2006.01) |
| H05K 7/20 | (2006.01) |
| H01H 37/04 | (2006.01) |
| H02G 3/12 | (2006.01) |
| F24F 13/20 | (2006.01) |
| F24F 11/00 | (2006.01) |

(52) U.S. Cl.
CPC ........ *H02G 3/123* (2013.01); *F24F 2011/0091* (2013.01); *F24F 11/00* (2013.01); *F24F 13/20* (2013.01)

USPC ........ 174/58; 174/489; 174/561; 361/679.49; 361/809; 337/380

(58) Field of Classification Search
USPC ........... 174/58, 481, 502, 503, 480, 489, 561, 174/562; 361/679.61, 809, 679.02, 679.58, 361/679.16, 679.39, 679.49, 679.5, 692; 236/91 C, 91 D, 94; 220/3.2, 3.6, 210, 220/242; 700/276; 337/380
See application file for complete search history.

(56) References Cited

U.S. PATENT DOCUMENTS 4,048,491 A * 9/1977 Wessman ...................... 248/343
4,187,543 A 2/1980 Healey et al.
(Continued)

FOREIGN PATENT DOCUMENTS

| EP | 0980165 A2 | 2/2000 |
| EP | 1956311 A2 | 8/2008 |

(Continued)

OTHER PUBLICATIONS

Definition of track from Dictionary.com Mar. 12, 2013.*
(Continued)

*Primary Examiner* — Chau N Nguyen
*Assistant Examiner* — Roshn Varghese

(57) ABSTRACT

One aspect provides of this disclosure provides a flush wall mounting system for an electronic controller. This embodiment comprises a housing for receiving electrical components therein and having a front panel and a back panel coupled to the front panel. The back panel has a raised portion extending therefrom. This aspect further includes a mounting plate removably couplable to the back panel of the housing and has front and back sides. The front side includes a flange around a perimeter thereof and has a recess formed therein configured to receive the raised portion of the back panel therein. The recess forms a raised portion extending from the back side and configured to be receivable within an opening in a wall. A method for manufacturing the mounting system is also provided.

13 Claims, 13 Drawing Sheets

(56) References Cited

U.S. PATENT DOCUMENTS

| | | |
|---|---|---|
| 4,231,352 A | 11/1980 | Bowden et al. |
| 4,262,736 A | 4/1981 | Gilkeson et al. |
| 4,296,464 A | 10/1981 | Woods et al. |
| 4,381,549 A | 4/1983 | Stamp et al. |
| 4,464,543 A | 8/1984 | Kline et al. |
| 4,482,785 A | 11/1984 | Finnegan et al. |
| 4,497,031 A | 1/1985 | Froehling et al. |
| 4,501,125 A | 2/1985 | Han |
| 4,606,042 A | 8/1986 | Kahn et al. |
| 4,616,325 A | 10/1986 | Heckenbach et al. |
| 4,694,394 A | 9/1987 | Costantini |
| 4,698,628 A | 10/1987 | Herkert et al. |
| 4,703,325 A | 10/1987 | Chamberlin et al. |
| 4,706,247 A | 11/1987 | Yoshioka |
| 4,723,239 A | 2/1988 | Schwartz |
| 4,829,447 A | 5/1989 | Parker et al. |
| 4,841,450 A | 6/1989 | Fredriksson |
| 4,843,084 A | 6/1989 | Parker et al. |
| 4,873,649 A | 10/1989 | Grald et al. |
| 4,884,214 A | 11/1989 | Parker et al. |
| 4,887,262 A | 12/1989 | van Veldhuizen |
| 4,888,728 A | 12/1989 | Shirakawa et al. |
| 4,889,280 A | 12/1989 | Grald et al. |
| 4,931,948 A | 6/1990 | Parker et al. |
| 4,941,143 A | 7/1990 | Twitty et al. |
| 4,942,613 A | 7/1990 | Lynch |
| 4,947,484 A | 8/1990 | Twitty et al. |
| 4,947,928 A | 8/1990 | Parker et al. |
| 4,953,083 A | 8/1990 | Takata et al. |
| 4,955,018 A | 9/1990 | Twitty et al. |
| 4,967,567 A | 11/1990 | Proctor et al. |
| 4,978,896 A | 12/1990 | Shah |
| 4,991,770 A | 2/1991 | Bird et al. |
| 4,996,513 A | 2/1991 | Mak et al. |
| 5,006,827 A | 4/1991 | Brueton et al. |
| 5,018,138 A | 5/1991 | Twitty et al. |
| 5,039,980 A | 8/1991 | Aggers et al. |
| 5,042,997 A | 8/1991 | Rhodes |
| 5,058,388 A | 10/1991 | Shaw et al. |
| 5,061,916 A | 10/1991 | French et al. |
| 5,065,813 A | 11/1991 | Berkeley et al. |
| 5,086,385 A | 2/1992 | Launey et al. |
| 5,103,896 A | 4/1992 | Saga |
| 5,105,366 A | 4/1992 | Beckey |
| 5,115,967 A | 5/1992 | Wedekind |
| 5,128,855 A | 7/1992 | Hilber et al. |
| 5,165,465 A | 11/1992 | Kenet |
| 5,170,935 A | 12/1992 | Federspiel et al. |
| 5,180,102 A | 1/1993 | Gilbert et al. |
| 5,181,653 A | 1/1993 | Foster et al. |
| 5,184,122 A | 2/1993 | Decious et al. |
| 5,191,643 A | 3/1993 | Alsenz |
| 5,195,327 A | 3/1993 | Kim |
| 5,197,666 A | 3/1993 | Wedekind |
| 5,197,668 A | 3/1993 | Ratz et al. |
| 5,203,497 A | 4/1993 | Ratz et al. |
| 5,220,260 A | 6/1993 | Schuler |
| 5,230,482 A | 7/1993 | Ratz et al. |
| 5,259,553 A | 11/1993 | Shyu |
| 5,274,571 A | 12/1993 | Hessee et al. |
| 5,276,630 A | 1/1994 | Baldwin et al. |
| 5,277,036 A | 1/1994 | Dieckmann et al. |
| 5,278,957 A | 1/1994 | Chan |
| 5,279,458 A | 1/1994 | DeWolf et al. |
| 5,297,143 A | 3/1994 | Fridrich et al. |
| 5,314,004 A | 5/1994 | Strand et al. |
| 5,323,385 A | 6/1994 | Jurewicz et al. |
| 5,323,619 A | 6/1994 | Kim |
| 5,327,426 A | 7/1994 | Dolin, Jr. et al. |
| 5,329,991 A | 7/1994 | Mehta et al. |
| 5,337,952 A | 8/1994 | Thompson |
| 5,341,988 A | 8/1994 | Rein et al. |
| 5,355,323 A | 10/1994 | Bae |
| 5,361,982 A | 11/1994 | Liebl et al. |
| 5,374,200 A | 12/1994 | Giroux |
| 5,383,116 A | 1/1995 | Lennartsson |
| 5,384,697 A | 1/1995 | Pascucci |
| 5,414,337 A | 5/1995 | Schuler |
| 5,417,368 A | 5/1995 | Jeffery et al. |
| 5,420,572 A | 5/1995 | Dolin, Jr. et al. |
| 5,434,965 A | 7/1995 | Matheny et al. |
| 5,440,895 A | 8/1995 | Bahel et al. |
| 5,444,626 A | 8/1995 | Schenk |
| 5,444,851 A | 8/1995 | Woest |
| 5,448,180 A | 9/1995 | Kienzler et al. |
| 5,448,561 A | 9/1995 | Kaiser et al. |
| 5,449,047 A | 9/1995 | Schivley, Jr. |
| 5,449,112 A | 9/1995 | Heitman et al. |
| 5,450,570 A | 9/1995 | Richek et al. |
| 5,452,201 A | 9/1995 | Pieronek et al. |
| 5,460,327 A | 10/1995 | Hill et al. |
| 5,463,735 A | 10/1995 | Pascucci et al. |
| 5,469,150 A | 11/1995 | Sitte |
| 5,475,364 A | 12/1995 | Kenet |
| 5,481,481 A | 1/1996 | Frey et al. |
| 5,481,661 A | 1/1996 | Kobayashi |
| 5,488,834 A | 2/1996 | Schwarz |
| 5,491,649 A | 2/1996 | Friday, Jr. et al. |
| 5,502,818 A | 3/1996 | Lamberg |
| 5,511,188 A | 4/1996 | Pascucci et al. |
| 5,513,324 A | 4/1996 | Dolin, Jr. et al. |
| 5,515,267 A | 5/1996 | Alsenz |
| 5,520,328 A | 5/1996 | Bujak, Jr. |
| 5,522,044 A | 5/1996 | Pascucci et al. |
| 5,530,643 A | 6/1996 | Hodorowski |
| 5,537,339 A | 7/1996 | Naganuma et al. |
| 5,539,778 A | 7/1996 | Kienzler et al. |
| 5,544,036 A | 8/1996 | Brown, Jr. et al. |
| 5,544,809 A | 8/1996 | Keating et al. |
| 5,550,980 A | 8/1996 | Pascucci et al. |
| 5,551,053 A | 8/1996 | Nadolski et al. |
| 5,555,269 A | 9/1996 | Friday, Jr. et al. |
| 5,555,509 A | 9/1996 | Dolan et al. |
| 5,559,407 A | 9/1996 | Dudley et al. |
| 5,559,412 A | 9/1996 | Schuler |
| 5,566,879 A | 10/1996 | Longtin |
| 5,572,658 A | 11/1996 | Mohr et al. |
| 5,574,848 A | 11/1996 | Thomson |
| 5,579,221 A | 11/1996 | Mun |
| 5,581,478 A | 12/1996 | Cruse et al. |
| 5,592,058 A | 1/1997 | Archer et al. |
| 5,592,059 A | 1/1997 | Archer |
| 5,592,628 A | 1/1997 | Ueno et al. |
| 5,596,437 A | 1/1997 | Heins |
| 5,598,566 A | 1/1997 | Pascucci et al. |
| 5,600,782 A | 2/1997 | Thomson |
| 5,613,157 A | 3/1997 | Davidson et al. |
| 5,613,369 A | 3/1997 | Sato et al. |
| 5,617,282 A | 4/1997 | Rall et al. |
| 5,621,662 A | 4/1997 | Humphries et al. |
| 5,623,392 A * | 4/1997 | Ma ............................ 361/679.22 |
| 5,628,201 A | 5/1997 | Bahel et al. |
| 5,630,325 A | 5/1997 | Bahel et al. |
| 5,631,825 A | 5/1997 | van Weele et al. |
| 5,634,590 A | 6/1997 | Gorski et al. |
| 5,675,756 A | 10/1997 | Benton et al. |
| 5,675,830 A | 10/1997 | Satula |
| 5,684,463 A | 11/1997 | Diercks et al. |
| 5,684,717 A | 11/1997 | Beilfuss et al. |
| 5,699,243 A | 12/1997 | Eckel et al. |
| 5,706,190 A | 1/1998 | Russ et al. |
| 5,711,480 A | 1/1998 | Zepke et al. |
| 5,720,604 A | 2/1998 | Kelly et al. |
| 5,722,822 A | 3/1998 | Wilson et al. |
| 5,726,900 A | 3/1998 | Walter et al. |
| 5,729,442 A * | 3/1998 | Frantz ............................ 361/823 |
| 5,737,529 A | 4/1998 | Dolin, Jr. et al. |
| 5,748,923 A | 5/1998 | Eitrich |
| 5,751,572 A | 5/1998 | Maciulewicz |
| 5,751,948 A | 5/1998 | Dolan et al. |
| 5,754,779 A | 5/1998 | Dolin, Jr. et al. |
| 5,761,083 A | 6/1998 | Brown, Jr. et al. |
| 5,764,146 A | 6/1998 | Baldwin et al. |
| 5,772,326 A | 6/1998 | Batko et al. |

(56) References Cited

U.S. PATENT DOCUMENTS

| | | |
|---|---|---|
| 5,772,732 A | 6/1998 | James et al. |
| 5,774,322 A | 6/1998 | Walter et al. |
| 5,774,492 A | 6/1998 | Orlowsik, Jr. et al. |
| 5,774,493 A | 6/1998 | Ross |
| 5,777,837 A | 7/1998 | Eckel et al. |
| 5,782,296 A | 7/1998 | Mehta |
| 5,784,647 A | 7/1998 | Sugimoto |
| 5,786,993 A | 7/1998 | Frutiger et al. |
| 5,787,027 A | 7/1998 | Dolan et al. |
| 5,791,332 A | 8/1998 | Thompson et al. |
| 5,793,646 A | 8/1998 | Hibberd et al. |
| 5,801,942 A | 9/1998 | Nixon et al. |
| 5,802,485 A | 9/1998 | Koelle et al. |
| 5,803,357 A | 9/1998 | Lakin |
| 5,809,063 A | 9/1998 | Ashe et al. |
| 5,809,556 A | 9/1998 | Fujisawa et al. |
| 5,810,245 A | 9/1998 | Heitman et al. |
| 5,816,492 A | 10/1998 | Charles et al. |
| 5,818,347 A | 10/1998 | Dolan et al. |
| 5,819,845 A | 10/1998 | Ryu et al. |
| 5,822,512 A | 10/1998 | Goodrum et al. |
| 5,826,038 A | 10/1998 | Nakazumi |
| 5,829,674 A | 11/1998 | Vanostrand et al. |
| 5,841,654 A | 11/1998 | Verissimo et al. |
| 5,848,887 A | 12/1998 | Zabielski et al. |
| 5,854,744 A | 12/1998 | Zeng et al. |
| 5,856,972 A | 1/1999 | Riley et al. |
| 5,860,411 A | 1/1999 | Thompson et al. |
| 5,860,473 A | 1/1999 | Seiden |
| 5,862,052 A | 1/1999 | Nixon et al. |
| 5,862,411 A | 1/1999 | Kay et al. |
| 5,864,581 A | 1/1999 | Alger-Meunier et al. |
| 5,873,519 A | 2/1999 | Beilfuss |
| 5,878,236 A | 3/1999 | Kleineberg et al. |
| 5,883,627 A | 3/1999 | Pleyer |
| 5,884,072 A | 3/1999 | Rasmussen |
| 5,887,651 A | 3/1999 | Meyer |
| 5,892,690 A | 4/1999 | Boatman et al. |
| 5,896,304 A | 4/1999 | Tiemann et al. |
| 5,900,674 A | 5/1999 | Wojnarowski et al. |
| 5,903,454 A | 5/1999 | Hoffberg et al. |
| 5,912,877 A | 6/1999 | Shirai et al. |
| 5,914,453 A | 6/1999 | James et al. |
| 5,915,101 A | 6/1999 | Kleineberg et al. |
| 5,924,486 A | 7/1999 | Ehlers et al. |
| 5,927,398 A | 7/1999 | Maciulewicz |
| 5,930,249 A | 7/1999 | Stademann et al. |
| 5,933,655 A | 8/1999 | Vrabec et al. |
| 5,934,554 A | 8/1999 | Charles et al. |
| 5,937,942 A | 8/1999 | Bias et al. |
| 5,946,209 A | 8/1999 | Eckel et al. |
| 5,962,989 A | 10/1999 | Baker |
| 5,971,597 A | 10/1999 | Baldwin et al. |
| 5,973,594 A | 10/1999 | Baldwin et al. |
| 5,974,554 A | 10/1999 | Oh |
| 5,976,010 A | 11/1999 | Reese et al. |
| 5,983,353 A | 11/1999 | McHann, Jr. |
| 5,983,646 A | 11/1999 | Grothe et al. |
| 5,993,195 A | 11/1999 | Thompson |
| 6,006,142 A | 12/1999 | Seem et al. |
| 6,011,821 A | 1/2000 | Sauer et al. |
| 6,021,252 A | 2/2000 | Faris et al. |
| 6,028,864 A | 2/2000 | Marttinen et al. |
| 6,032,178 A | 2/2000 | Bacigalupo et al. |
| 6,035,024 A | 3/2000 | Stumer |
| 6,046,410 A | 4/2000 | Wojnarowski et al. |
| 6,049,817 A | 4/2000 | Schoen et al. |
| 6,052,525 A | 4/2000 | Carlson et al. |
| 6,053,416 A | 4/2000 | Specht et al. |
| 6,061,600 A | 5/2000 | Ying |
| 6,061,603 A | 5/2000 | Papadopoulos et al. |
| 6,078,660 A | 6/2000 | Burgess |
| 6,082,894 A | 7/2000 | Batko et al. |
| 6,092,280 A | 7/2000 | Wojnarowski |
| 6,095,674 A | 8/2000 | Verissimo et al. |
| 6,098,116 A | 8/2000 | Nixon et al. |
| 6,101,824 A | 8/2000 | Meyer et al. |
| 6,110,260 A | 8/2000 | Kubokawa |
| 6,115,713 A | 9/2000 | Pascucci et al. |
| 6,138,227 A | 10/2000 | Thewes et al. |
| 6,141,595 A | 10/2000 | Gloudeman et al. |
| 6,145,501 A | 11/2000 | Manohar et al. |
| 6,145,751 A | 11/2000 | Ahmed |
| 6,147,601 A | 11/2000 | Sandelman et al. |
| 6,151,298 A | 11/2000 | Bernhardsson et al. |
| 6,151,529 A | 11/2000 | Batko |
| 6,151,625 A | 11/2000 | Swales et al. |
| 6,151,650 A | 11/2000 | Birzer |
| 6,155,341 A | 12/2000 | Thompson et al. |
| 6,160,477 A | 12/2000 | Sandelman et al. |
| 6,160,484 A | 12/2000 | Spahl et al. |
| 6,160,795 A | 12/2000 | Hosemann |
| 6,167,338 A | 12/2000 | De Wille et al. |
| 6,169,937 B1 | 1/2001 | Peterson |
| 6,169,964 B1 | 1/2001 | Aisa et al. |
| 6,170,044 B1 | 1/2001 | McLaughlin et al. |
| 6,177,945 B1 | 1/2001 | Pleyer |
| 6,179,213 B1 | 1/2001 | Gibino et al. |
| 6,182,130 B1 | 1/2001 | Dolin, Jr. et al. |
| 6,188,642 B1 | 2/2001 | Schoniger et al. |
| 6,190,442 B1 | 2/2001 | Redner |
| 6,208,905 B1 | 3/2001 | Giddings et al. |
| 6,208,924 B1 | 3/2001 | Bauer |
| 6,211,782 B1 | 4/2001 | Sandelman et al. |
| 6,216,066 B1 | 4/2001 | Goebel et al. |
| 6,227,191 B1 | 5/2001 | Garloch |
| 6,232,604 B1 | 5/2001 | McDaniel et al. |
| 6,237,113 B1 | 5/2001 | Daiber |
| 6,240,326 B1 | 5/2001 | Gloudeman et al. |
| 6,241,156 B1 | 6/2001 | Kline et al. |
| 6,252,890 B1 | 6/2001 | Alger-Meunier et al. |
| 6,254,009 B1 | 7/2001 | Proffitt et al. |
| 6,266,205 B1 | 7/2001 | Schreck et al. |
| 6,269,127 B1 | 7/2001 | Richards |
| 6,271,845 B1 | 8/2001 | Richardson |
| 6,282,454 B1 | 8/2001 | Papadopoulos et al. |
| 6,285,912 B1 | 9/2001 | Ellison et al. |
| 6,292,518 B1 | 9/2001 | Grabb et al. |
| 6,298,376 B1 | 10/2001 | Rosner et al. |
| 6,298,454 B1 | 10/2001 | Schleiss et al. |
| 6,298,551 B1 | 10/2001 | Wojnarowski et al. |
| 6,304,557 B1 | 10/2001 | Nakazumi |
| 6,307,331 B1 | 10/2001 | Bonasia et al. |
| 6,324,008 B1 | 11/2001 | Baldwin et al. |
| 6,324,854 B1 | 12/2001 | Jayanth |
| 6,336,065 B1 | 1/2002 | Gibson et al. |
| 6,343,236 B1 | 1/2002 | Gibson et al. |
| 6,349,306 B1 | 2/2002 | Malik et al. |
| 6,349,883 B1 | 2/2002 | Simmons et al. |
| 6,353,775 B1 | 3/2002 | Nichols |
| 6,359,220 B2 * | 3/2002 | Schiedegger et al. ........... 174/50 |
| 6,363,422 B1 | 3/2002 | Hunter et al. |
| 6,370,037 B1 * | 4/2002 | Schoenfish .................. 361/807 |
| 6,374,373 B1 | 4/2002 | Heim et al. |
| 6,377,283 B1 | 4/2002 | Thomas |
| 6,385,510 B1 | 5/2002 | Hoog et al. |
| 6,390,806 B1 | 5/2002 | Dempsey et al. |
| 6,393,023 B1 | 5/2002 | Shimizu et al. |
| 6,400,996 B1 | 6/2002 | Hoffberg et al. |
| 6,405,104 B1 | 6/2002 | Dougherty |
| 6,408,228 B1 | 6/2002 | Seem et al. |
| 6,411,701 B1 | 6/2002 | Stademann |
| 6,411,857 B1 | 6/2002 | Flood |
| 6,412,435 B1 | 7/2002 | Timmons, Jr. |
| 6,415,395 B1 | 7/2002 | Varma et al. |
| 6,418,507 B1 | 7/2002 | Fackler |
| 6,423,118 B1 | 7/2002 | Becerra et al. |
| 6,424,872 B1 | 7/2002 | Glanzer et al. |
| 6,424,874 B1 | 7/2002 | Cofer |
| 6,427,454 B1 | 8/2002 | West |
| 6,429,845 B1 | 8/2002 | Unseld et al. |
| 6,430,953 B2 | 8/2002 | Roh |
| 6,434,715 B1 | 8/2002 | Andersen |
| 6,435,418 B1 | 8/2002 | Toth et al. |

(56) References Cited

U.S. PATENT DOCUMENTS

| | | |
|---|---|---|
| 6,437,691 B1 | 8/2002 | Sandelman et al. |
| 6,437,805 B1 | 8/2002 | Sojoodi et al. |
| 6,441,723 B1 | 8/2002 | Mansfield et al. |
| 6,442,952 B2 | 9/2002 | Roh et al. |
| 6,448,896 B1 | 9/2002 | Bankus et al. |
| 6,449,315 B2 | 9/2002 | Richards |
| 6,450,409 B1 | 9/2002 | Rowlette et al. |
| 6,453,374 B1 | 9/2002 | Kovalan et al. |
| 6,454,177 B1 | 9/2002 | Sasao et al. |
| 6,462,654 B1 | 10/2002 | Sandelman et al. |
| 6,478,084 B1 | 11/2002 | Kumar et al. |
| 6,493,661 B1 | 12/2002 | White et al. |
| 6,497,570 B1 | 12/2002 | Sears et al. |
| 6,498,844 B1 | 12/2002 | Stademann |
| 6,501,995 B1 | 12/2002 | Kinney et al. |
| 6,504,338 B1 | 1/2003 | Eichorn |
| 6,505,087 B1 | 1/2003 | Lucas et al. |
| 6,508,407 B1 | 1/2003 | Lefkowitz et al. |
| 6,526,122 B2 | 2/2003 | Matsushita et al. |
| 6,535,123 B2 | 3/2003 | Sandelman et al. |
| 6,535,138 B1 | 3/2003 | Dolan et al. |
| 6,539,489 B1 | 3/2003 | Reinert |
| 6,540,148 B1 | 4/2003 | Salsbury et al. |
| 6,542,462 B1 | 4/2003 | Sohraby et al. |
| 6,543,007 B1 | 4/2003 | Bliley et al. |
| 6,545,660 B1 | 4/2003 | Shen et al. |
| 6,546,008 B1 | 4/2003 | Wehrend |
| 6,552,647 B1 | 4/2003 | Thiessen et al. |
| 6,554,198 B1 | 4/2003 | Hull et al. |
| 6,560,976 B2 | 5/2003 | Jayanth |
| 6,564,348 B1 | 5/2003 | Barenys et al. |
| 6,567,476 B2 | 5/2003 | Kohl et al. |
| 6,572,363 B1 | 6/2003 | Virgil, Jr. et al. |
| 6,574,215 B2 | 6/2003 | Hummel |
| 6,574,234 B1 | 6/2003 | Myer et al. |
| 6,574,581 B1 | 6/2003 | Bohrer et al. |
| 6,575,233 B1 | 6/2003 | Krumnow |
| 6,580,950 B1 | 6/2003 | Johnson et al. |
| 6,587,039 B1 | 7/2003 | Woestemeyer et al. |
| 6,587,739 B1 | 7/2003 | Abrams et al. |
| 6,587,884 B1 | 7/2003 | Papadopoulos et al. |
| 6,594,272 B1 | 7/2003 | Ketcham et al. |
| 6,595,430 B1 | 7/2003 | Shah |
| 6,600,923 B1 | 7/2003 | Dzuban |
| 6,608,560 B2 | 8/2003 | Abrams |
| 6,609,127 B1 | 8/2003 | Lee et al. |
| 6,615,088 B1 | 9/2003 | Myer et al. |
| 6,615,594 B2 | 9/2003 | Jayanth et al. |
| 6,618,394 B1 | 9/2003 | Hilleary |
| 6,619,555 B2 | 9/2003 | Rosen |
| 6,621,507 B1 | 9/2003 | Shah |
| 6,622,926 B1 | 9/2003 | Sartain et al. |
| 6,628,993 B1 | 9/2003 | Bauer |
| 6,633,781 B1 | 10/2003 | Lee et al. |
| 6,636,771 B1 | 10/2003 | Varma et al. |
| 6,639,939 B1 | 10/2003 | Naden et al. |
| 6,640,145 B2 | 10/2003 | Hoffberg et al. |
| 6,640,890 B1 | 11/2003 | Dage et al. |
| 6,643,689 B2 | 11/2003 | Rode et al. |
| 6,644,557 B1 | 11/2003 | Jacobs |
| 6,647,317 B2 | 11/2003 | Takai et al. |
| 6,650,949 B1 | 11/2003 | Fera et al. |
| 6,651,034 B1 | 11/2003 | Hedlund et al. |
| 6,658,373 B2 | 12/2003 | Rossi et al. |
| RE38,406 E | 1/2004 | Faris et al. |
| 6,681,215 B2 | 1/2004 | Jammu |
| 6,688,387 B1 | 2/2004 | Wellington et al. |
| 6,704,688 B2 | 3/2004 | Aslam et al. |
| 6,708,239 B1 | 3/2004 | Ellerbrock et al. |
| 6,715,120 B1 | 3/2004 | Hladik et al. |
| 6,715,302 B2 | 4/2004 | Ferragut, II |
| 6,715,690 B2 | 4/2004 | Hull et al. |
| 6,717,513 B1 | 4/2004 | Sandelman et al. |
| 6,717,919 B1 | 4/2004 | Ketcham et al. |
| 6,718,384 B2 | 4/2004 | Linzy |
| 6,722,143 B2 | 4/2004 | Moon et al. |
| 6,725,180 B2 | 4/2004 | Mayer et al. |
| 6,725,398 B1 | 4/2004 | Varma et al. |
| 6,728,369 B2 | 4/2004 | Burgess |
| 6,732,191 B1 | 5/2004 | Baker et al. |
| 6,735,196 B1 | 5/2004 | Manzardo |
| 6,735,282 B2 | 5/2004 | Matsushita et al. |
| 6,735,965 B2 | 5/2004 | Moon et al. |
| 6,738,676 B2 | 5/2004 | Hirayama |
| 6,741,915 B2 | 5/2004 | Poth |
| 6,744,771 B1 | 6/2004 | Barber et al. |
| 6,745,106 B2 | 6/2004 | Howard et al. |
| 6,747,888 B2 | 6/2004 | Klein |
| 6,758,050 B2 | 7/2004 | Jayanth et al. |
| 6,758,051 B2 | 7/2004 | Jayanth et al. |
| 6,763,040 B1 | 7/2004 | Hite et al. |
| 6,763,272 B2 | 7/2004 | Knepper |
| 6,765,993 B2 | 7/2004 | Cueman |
| 6,768,732 B1 | 7/2004 | Neuhaus |
| 6,774,786 B1 | 8/2004 | Havekost et al. |
| 6,779,176 B1 | 8/2004 | Chambers, II et al. |
| 6,783,079 B2 | 8/2004 | Carey et al. |
| 6,789,739 B2 | 9/2004 | Rosen |
| 6,791,530 B2 | 9/2004 | Vernier et al. |
| 6,795,935 B1 | 9/2004 | Unkle et al. |
| 6,798,341 B1 | 9/2004 | Eckel et al. |
| 6,801,524 B2 | 10/2004 | Eteminan |
| 6,804,564 B2 | 10/2004 | Crispin et al. |
| 6,810,333 B2 | 10/2004 | Adedeji et al. |
| 6,814,299 B1 | 11/2004 | Carey |
| 6,814,660 B1 | 11/2004 | Cavett |
| 6,816,071 B2 | 11/2004 | Conti |
| 6,817,757 B1 | 11/2004 | Wallace |
| 6,819,802 B2 | 11/2004 | Higgs et al. |
| 6,822,202 B2 | 11/2004 | Atlas |
| 6,823,680 B2 | 11/2004 | Jayanth |
| 6,824,069 B2 | 11/2004 | Rosen |
| 6,826,454 B2 | 11/2004 | Sulfstede |
| 6,826,590 B1 | 11/2004 | Glanzer et al. |
| 6,832,118 B1 | 12/2004 | Heberlein et al. |
| 6,833,787 B1 | 12/2004 | Levi |
| 6,833,844 B1 | 12/2004 | Shiota et al. |
| 6,840,052 B2 | 1/2005 | Smith et al. |
| 6,842,117 B2 | 1/2005 | Keown |
| 6,842,808 B2 | 1/2005 | Weigl et al. |
| 6,845,918 B2 | 1/2005 | Rotondo |
| 6,850,992 B2 | 2/2005 | Heinrich et al. |
| 6,851,948 B2 | 2/2005 | Dempsey et al. |
| 6,853,291 B1 | 2/2005 | Aisa |
| 6,854,444 B2 | 2/2005 | Plagge et al. |
| 6,865,449 B2 | 3/2005 | Dudley |
| 6,865,596 B1 | 3/2005 | Barber et al. |
| 6,865,898 B2 | 3/2005 | Yamanashi et al. |
| 6,866,375 B2 | 3/2005 | Leighton et al. |
| 6,868,292 B2 | 3/2005 | Ficco et al. |
| 6,868,900 B2 | 3/2005 | Dage et al. |
| 6,874,691 B1 | 4/2005 | Hildebrand et al. |
| 6,874,693 B2 | 4/2005 | Readio et al. |
| 6,876,891 B1 | 4/2005 | Schuler et al. |
| 6,879,881 B1 | 4/2005 | Attridge, Jr. |
| 6,888,441 B2 | 5/2005 | Carey |
| 6,892,121 B2 | 5/2005 | Schmidt |
| 6,894,703 B2 | 5/2005 | Vernier et al. |
| 6,900,808 B2 | 5/2005 | Lassiter et al. |
| 6,901,316 B1 | 5/2005 | Jensen et al. |
| 6,901,439 B1 | 5/2005 | Bonasia et al. |
| 6,907,329 B2 | 6/2005 | Junger et al. |
| 6,909,948 B2 | 6/2005 | Mollmann et al. |
| 6,914,893 B2 | 7/2005 | Petite |
| 6,918,064 B2 | 7/2005 | Mueller et al. |
| 6,920,318 B2 | 7/2005 | Brooking et al. |
| 6,925,360 B2 | 8/2005 | Yoon et al. |
| 6,931,645 B2 | 8/2005 | Murching et al. |
| 6,938,106 B2 | 8/2005 | Ellerbrock et al. |
| 6,941,193 B2 | 9/2005 | Frecska et al. |
| 6,944,785 B2 | 9/2005 | Gadir et al. |
| 6,954,680 B2 | 10/2005 | Kreidler et al. |
| 6,955,060 B2 | 10/2005 | Homan et al. |
| 6,955,302 B2 | 10/2005 | Erdman, Jr. |

(56) References Cited

U.S. PATENT DOCUMENTS

| | | |
|---|---|---|
| 6,956,424 B2 | 10/2005 | Hohnel |
| 6,957,696 B1 | 10/2005 | Krumnow |
| 6,963,288 B1 | 11/2005 | Sokol et al. |
| 6,963,922 B2 | 11/2005 | Papadopoulos et al. |
| 6,965,802 B2 | 11/2005 | Sexton |
| 6,967,565 B2 | 11/2005 | Lingemann |
| 6,968,295 B1 | 11/2005 | Carr |
| 6,973,366 B2 | 12/2005 | Komai |
| 6,975,219 B2 | 12/2005 | Eryurek et al. |
| 6,975,913 B2 | 12/2005 | Kreidler et al. |
| 6,975,958 B2 | 12/2005 | Bohrer et al. |
| 6,980,796 B1 | 12/2005 | Cuellar et al. |
| 6,981,266 B1 | 12/2005 | An et al. |
| 6,983,271 B2 | 1/2006 | Morrow et al. |
| 6,983,889 B2 | 1/2006 | Alles |
| 6,988,011 B2 | 1/2006 | Varma et al. |
| 6,988,671 B2 | 1/2006 | DeLuca |
| 6,990,381 B2 | 1/2006 | Nomura et al. |
| 6,990,540 B2 | 1/2006 | Dalakuras et al. |
| 6,993,414 B2 | 1/2006 | Shah |
| RE38,985 E | 2/2006 | Boatman et al. |
| 6,994,620 B2 | 2/2006 | Mills |
| 6,999,473 B2 | 2/2006 | Windecker |
| 6,999,824 B2 | 2/2006 | Glanzer et al. |
| 7,000,849 B2 | 2/2006 | Ashworth et al. |
| 7,002,462 B2 | 2/2006 | Welch |
| 7,003,378 B2 | 2/2006 | Poth |
| 7,006,460 B1 | 2/2006 | Vollmer et al. |
| 7,006,881 B1 | 2/2006 | Hoffberg et al. |
| 7,013,239 B2 | 3/2006 | Hedlund et al. |
| 7,017,827 B2 | 3/2006 | Shah et al. |
| 7,020,798 B2 | 3/2006 | Meng et al. |
| 7,022,008 B1 | 4/2006 | Crocker |
| 7,024,282 B2 | 4/2006 | Coogan et al. |
| 7,024,283 B2 | 4/2006 | Bicknell |
| 7,025,281 B2 | 4/2006 | DeLuca |
| 7,027,808 B2 | 4/2006 | Wesby |
| 7,029,391 B2 | 4/2006 | Nagaya et al. |
| 7,031,880 B1 | 4/2006 | Seem et al. |
| 7,032,018 B2 | 4/2006 | Lee et al. |
| 7,035,719 B2 | 4/2006 | Howard et al. |
| 7,035,898 B1 | 4/2006 | Baker |
| 7,036,743 B2 | 5/2006 | Shah |
| 7,043,339 B2 | 5/2006 | Maeda et al. |
| 7,044,397 B2 | 5/2006 | Bartlett et al. |
| 7,047,092 B2 | 5/2006 | Wimsatt |
| 7,051,282 B2 | 5/2006 | Marcjan |
| 7,055,759 B2 | 6/2006 | Wacker et al. |
| 7,058,459 B2 | 6/2006 | Weiberle et al. |
| 7,058,477 B1 | 6/2006 | Rosen |
| 7,058,693 B1 | 6/2006 | Baker, Jr. |
| 7,058,737 B2 | 6/2006 | Ellerbrock et al. |
| 7,062,927 B2 | 6/2006 | Kwon et al. |
| 7,068,612 B2 | 6/2006 | Berkcan et al. |
| 7,076,962 B2 | 7/2006 | He et al. |
| 7,082,339 B2 | 7/2006 | Murray et al. |
| 7,082,352 B2 | 7/2006 | Lim |
| 7,083,109 B2 | 8/2006 | Pouchak |
| 7,085,626 B2 | 8/2006 | Harrod et al. |
| 7,085,814 B1 | 8/2006 | Gandhi et al. |
| 7,089,087 B2 | 8/2006 | Dudley |
| 7,089,088 B2 | 8/2006 | Terry et al. |
| 7,089,530 B1 | 8/2006 | Dardinski et al. |
| 7,092,768 B1 | 8/2006 | Labuda |
| 7,092,772 B2 | 8/2006 | Murray et al. |
| 7,092,794 B1 | 8/2006 | Hill et al. |
| 7,096,078 B2 | 8/2006 | Burr et al. |
| 7,096,285 B2 | 8/2006 | Ellerbrock et al. |
| 7,096,465 B1 | 8/2006 | Dardinski et al. |
| 7,099,965 B2 | 8/2006 | Ellerbrock et al. |
| 7,100,382 B2 | 9/2006 | Butler et al. |
| 7,103,000 B1 | 9/2006 | Rode et al. |
| 7,103,016 B1 | 9/2006 | Duffy et al. |
| 7,103,420 B2 | 9/2006 | Brown et al. |
| 7,110,835 B2 | 9/2006 | Blevins et al. |
| 7,114,088 B2 | 9/2006 | Horbelt |
| 7,114,554 B2 | 10/2006 | Bergman et al. |
| 7,117,050 B2 | 10/2006 | Sasaki et al. |
| 7,117,051 B2 | 10/2006 | Landry et al. |
| 7,117,395 B2 | 10/2006 | Opaterny |
| 7,120,036 B2 | 10/2006 | Kyono |
| 7,123,428 B2 | 10/2006 | Yeo et al. |
| 7,123,774 B2 | 10/2006 | Dhavala et al. |
| 7,127,305 B1 | 10/2006 | Palmon |
| 7,127,327 B1 | 10/2006 | O'Donnell |
| 7,130,409 B2 | 10/2006 | Beyda |
| 7,130,719 B2 | 10/2006 | Ehlers et al. |
| 7,133,407 B2 | 11/2006 | Jinzaki et al. |
| 7,133,748 B2 | 11/2006 | Robinson |
| 7,133,749 B2 | 11/2006 | Goldberg et al. |
| 7,135,982 B2 | 11/2006 | Lee |
| 7,139,550 B2 | 11/2006 | Cuellar et al. |
| 7,142,948 B2 | 11/2006 | Metz |
| 7,146,230 B2 | 12/2006 | Glanzer et al. |
| 7,146,231 B2 | 12/2006 | Schleiss et al. |
| 7,146,253 B2 | 12/2006 | Hoog et al. |
| 7,150,408 B2 | 12/2006 | DeLuca |
| 7,154,866 B2 | 12/2006 | Shurmantine et al. |
| 7,155,318 B2 | 12/2006 | Sharma et al. |
| 7,155,499 B2 | 12/2006 | Soemo et al. |
| 7,156,316 B2 | 1/2007 | Kates |
| 7,162,512 B1 | 1/2007 | Amit et al. |
| 7,162,883 B2 | 1/2007 | Jayanth et al. |
| 7,163,156 B2 | 1/2007 | Kates |
| 7,163,158 B2 | 1/2007 | Rossi et al. |
| 7,167,762 B2 | 1/2007 | Glanzer et al. |
| 7,168,627 B2 | 1/2007 | Kates |
| 7,171,579 B2 | 1/2007 | Weigl et al. |
| 7,172,132 B2 | 2/2007 | Proffitt et al. |
| 7,172,160 B2 * | 2/2007 | Piel et al. .................. 248/27.1 |
| 7,174,239 B2 | 2/2007 | Butler et al. |
| 7,174,728 B2 | 2/2007 | Jayanth |
| 7,175,086 B2 | 2/2007 | Gascoyne et al. |
| 7,175,098 B2 | 2/2007 | DeLuca |
| 7,177,926 B2 | 2/2007 | Kramer |
| 7,181,317 B2 | 2/2007 | Amundson et al. |
| 7,185,262 B2 | 2/2007 | Barthel et al. |
| 7,186,290 B2 | 3/2007 | Sheehan et al. |
| 7,187,354 B2 | 3/2007 | Min et al. |
| 7,187,986 B2 | 3/2007 | Johnson et al. |
| 7,188,002 B2 | 3/2007 | Chapman, Jr. et al. |
| 7,188,207 B2 | 3/2007 | Mitter |
| 7,188,482 B2 | 3/2007 | Sadegh et al. |
| 7,188,779 B2 | 3/2007 | Alles |
| 7,191,028 B2 | 3/2007 | Nomura et al. |
| 7,194,663 B2 | 3/2007 | Fletcher et al. |
| 7,195,211 B2 | 3/2007 | Kande et al. |
| 7,197,717 B2 | 3/2007 | Anderson et al. |
| 7,200,450 B2 | 4/2007 | Boyer et al. |
| 7,203,165 B1 | 4/2007 | Kowalewski |
| 7,203,575 B2 | 4/2007 | Maturana et al. |
| 7,203,776 B2 | 4/2007 | Junger et al. |
| 7,206,646 B2 | 4/2007 | Nixon et al. |
| 7,206,647 B2 | 4/2007 | Kumar |
| 7,209,485 B2 | 4/2007 | Guse |
| 7,209,748 B2 | 4/2007 | Wong et al. |
| 7,212,825 B2 | 5/2007 | Wong et al |
| 7,213,044 B2 | 5/2007 | Tjong et al. |
| 7,216,016 B2 | 5/2007 | Van Ostrand et al. |
| 7,216,017 B2 | 5/2007 | Kwon et al. |
| 7,216,497 B2 | 5/2007 | Hull et al. |
| 7,218,589 B2 | 5/2007 | Wisnudel et al. |
| 7,218,996 B1 | 5/2007 | Beitelmal et al. |
| 7,219,141 B2 | 5/2007 | Bonasia et al. |
| 7,222,111 B1 | 5/2007 | Budke, Jr. |
| 7,222,152 B1 | 5/2007 | Thompson et al. |
| 7,222,493 B2 | 5/2007 | Jayanth et al. |
| 7,222,494 B2 | 5/2007 | Peterson et al. |
| 7,224,366 B2 | 5/2007 | Kessler et al. |
| 7,225,054 B2 | 5/2007 | Amundson et al. |
| 7,225,356 B2 | 5/2007 | Monitzer |
| 7,228,187 B2 | 6/2007 | Ticky et al. |
| 7,232,058 B2 | 6/2007 | Lee |
| 7,233,229 B2 | 6/2007 | Stroupe et al. |

(56) References Cited

U.S. PATENT DOCUMENTS

| | | |
|---|---|---|
| 7,239,623 B2 | 7/2007 | Burghardt et al. |
| 7,242,988 B1 | 7/2007 | Hoffberg et al. |
| 7,243,004 B2 | 7/2007 | Shah et al. |
| 7,244,294 B2 | 7/2007 | Kates |
| 7,246,753 B2 | 7/2007 | Hull et al. |
| 7,248,576 B2 | 7/2007 | Hoffmann |
| 7,251,534 B2 | 7/2007 | Walls et al. |
| 7,257,813 B1 | 8/2007 | Mayer et al. |
| 7,259,666 B1 | 8/2007 | Hermsmeyer et al. |
| 7,260,084 B2 | 8/2007 | Saller |
| 7,260,451 B2 | 8/2007 | Takai et al. |
| 7,260,609 B2 | 8/2007 | Fuehrer et al. |
| 7,260,948 B2 | 8/2007 | Jayanth et al. |
| 7,261,241 B2 | 8/2007 | Eoga |
| 7,261,243 B2 | 8/2007 | Butler et al. |
| 7,261,762 B2 | 8/2007 | Kang et al. |
| 7,266,775 B2 | 9/2007 | Patitucci |
| 7,266,960 B2 | 9/2007 | Shah |
| 7,269,962 B2 | 9/2007 | Bachmann |
| 7,272,154 B2 | 9/2007 | Loebig |
| 7,272,452 B2 | 9/2007 | Coogan et al. |
| 7,272,457 B2 | 9/2007 | Glanzer et al. |
| 7,274,972 B2 | 9/2007 | Amundson et al. |
| 7,274,973 B2 | 9/2007 | Nichols et al. |
| 7,277,280 B2 | 10/2007 | Peng |
| 7,277,970 B2 | 10/2007 | Ellerbrock et al. |
| 7,278,103 B1 | 10/2007 | Clark et al. |
| 7,281,697 B2 * | 10/2007 | Reggiani ............... 248/323 |
| 7,287,062 B2 | 10/2007 | Im et al. |
| 7,287,708 B2 | 10/2007 | Lucas et al. |
| 7,287,709 B2 | 10/2007 | Proffitt et al. |
| 7,289,458 B2 | 10/2007 | Gila et al. |
| 7,292,900 B2 | 11/2007 | Kreidler et al. |
| 7,293,422 B2 | 11/2007 | Parachini et al. |
| 7,295,099 B2 | 11/2007 | Lee et al. |
| 7,296,426 B2 | 11/2007 | Butler et al. |
| 7,299,279 B2 | 11/2007 | Sadaghiany |
| 7,299,996 B2 | 11/2007 | Garrett et al. |
| 7,301,699 B2 | 11/2007 | Kanamori et al. |
| 7,302,642 B2 | 11/2007 | Smith et al. |
| 7,305,495 B2 | 12/2007 | Carter |
| 7,306,165 B2 | 12/2007 | Shah |
| 7,310,559 B2 | 12/2007 | Walko, Jr. |
| 7,313,465 B1 | 12/2007 | O'Donnell |
| 7,313,716 B2 | 12/2007 | Weigl et al. |
| 7,313,923 B2 | 1/2008 | Jayanth et al. |
| 7,315,768 B2 | 1/2008 | Dang et al. |
| 7,317,970 B2 | 1/2008 | Pienta et al. |
| 7,318,089 B1 | 1/2008 | Stachura et al. |
| 7,320,110 B2 | 1/2008 | Shah |
| 7,324,874 B2 | 1/2008 | Jung |
| 7,327,376 B2 | 2/2008 | Shen et al. |
| 7,327,815 B1 | 2/2008 | Jurisch |
| 7,330,512 B2 | 2/2008 | Frank et al. |
| 7,331,191 B2 | 2/2008 | He et al. |
| 7,334,161 B2 | 2/2008 | Williams et al. |
| 7,336,650 B2 | 2/2008 | Franz et al. |
| 7,337,191 B2 | 2/2008 | Haeberle et al. |
| 7,337,369 B2 | 2/2008 | Barthel et al. |
| 7,337,619 B2 | 3/2008 | Hsieh et al. |
| 7,343,226 B2 | 3/2008 | Ehlers et al. |
| 7,346,404 B2 | 3/2008 | Eryurek et al. |
| 7,346,433 B2 | 3/2008 | Budike, Jr. |
| 7,346,835 B1 | 3/2008 | Lobinger et al. |
| 7,349,761 B1 | 3/2008 | Cruse |
| 7,354,005 B2 | 4/2008 | Carey et al. |
| 7,356,050 B2 | 4/2008 | Reindl et al. |
| 7,359,335 B2 | 4/2008 | Knop et al. |
| 7,359,345 B2 | 4/2008 | Chang et al. |
| 7,360,002 B2 | 4/2008 | Brueckner et al. |
| 7,360,370 B2 | 4/2008 | Shah et al. |
| 7,360,717 B2 | 4/2008 | Shah |
| 7,364,093 B2 | 4/2008 | Garozzo |
| 7,365,812 B2 | 4/2008 | Lee |
| 7,366,498 B2 | 4/2008 | Ko et al. |
| 7,366,944 B2 | 4/2008 | Oshins et al. |
| 7,370,074 B2 | 5/2008 | Alexander et al. |
| 7,377,450 B2 | 5/2008 | Van Ostrand et al. |
| 7,379,791 B2 | 5/2008 | Tamarkin et al. |
| 7,379,997 B2 | 5/2008 | Ehlers et al. |
| 7,383,158 B2 | 6/2008 | Krocker et al. |
| 7,389,150 B2 | 6/2008 | Inoue et al. |
| 7,389,204 B2 | 6/2008 | Eryurek et al. |
| RE40,437 E | 7/2008 | Rosen |
| 7,392,661 B2 | 7/2008 | Alles |
| 7,395,122 B2 | 7/2008 | Kreidler et al. |
| 7,395,137 B2 | 7/2008 | Robinson |
| 7,403,128 B2 | 7/2008 | Scuka et al. |
| 7,412,839 B2 | 8/2008 | Jayanth |
| 7,412,842 B2 | 8/2008 | Pham |
| 7,418,428 B2 | 8/2008 | Ehlers et al. |
| 7,424,345 B2 | 9/2008 | Norbeck |
| D578,026 S | 10/2008 | Roher et al. |
| 7,433,740 B2 | 10/2008 | Hesse et al. |
| 7,434,744 B2 | 10/2008 | Garozzo et al. |
| 7,436,292 B2 | 10/2008 | Rourke et al. |
| 7,436,293 B2 | 10/2008 | Rourke et al. |
| 7,436,296 B2 | 10/2008 | Rourke et al. |
| 7,436,400 B2 | 10/2008 | Cheng |
| 7,437,198 B2 | 10/2008 | Iwaki |
| 7,439,862 B2 | 10/2008 | Quan |
| 7,441,094 B2 | 10/2008 | Stephens |
| 7,446,660 B2 | 11/2008 | Posamentier |
| 7,448,435 B2 | 11/2008 | Garozzo |
| 7,451,937 B2 | 11/2008 | Flood et al. |
| 7,454,269 B1 | 11/2008 | Dushane et al. |
| 7,455,240 B2 | 11/2008 | Chapman, Jr. et al. |
| 7,457,853 B1 | 11/2008 | Chari et al. |
| 7,460,933 B2 | 12/2008 | Chapman, Jr. et al. |
| 7,476,988 B2 | 1/2009 | Mulhouse et al. |
| 7,516,106 B2 | 4/2009 | Ehlers et al. |
| 7,526,364 B2 | 4/2009 | Rule et al. |
| 7,567,523 B2 | 7/2009 | Black et al. |
| 7,567,844 B2 | 7/2009 | Thomas et al. |
| 7,571,195 B2 | 8/2009 | Billingsley et al. |
| 7,571,355 B2 | 8/2009 | Shabalin |
| 7,574,871 B2 | 8/2009 | Bloemer et al. |
| 7,584,897 B2 | 9/2009 | Schultz et al. |
| 7,587,459 B2 | 9/2009 | Wewalaarachchi |
| 7,593,124 B1 | 9/2009 | Sheng et al. |
| 7,593,787 B2 | 9/2009 | Feingold et al. |
| 7,604,046 B2 | 10/2009 | Bergman et al. |
| 7,624,931 B2 | 12/2009 | Chapman et al. |
| 7,641,126 B2 | 1/2010 | Schultz et al. |
| 7,650,323 B2 | 1/2010 | Hesse et al. |
| D610,475 S | 2/2010 | Beers et al. |
| 7,693,583 B2 | 4/2010 | Wolff et al. |
| 7,693,591 B2 | 4/2010 | Hoglund et al. |
| 7,706,923 B2 | 4/2010 | Amundson et al. |
| 7,730,223 B1 | 6/2010 | Bavor et al. |
| 7,734,572 B2 | 6/2010 | Wiemeyer et al. |
| 7,743,124 B2 | 6/2010 | Holdaway et al. |
| 7,747,757 B2 | 6/2010 | Garglulo et al. |
| 7,752,289 B2 | 7/2010 | Kikkawa et al. |
| 7,761,563 B2 | 7/2010 | Shike et al. |
| 7,774,102 B2 | 8/2010 | Butler et al. |
| 7,797,349 B2 | 9/2010 | Kosaka |
| 7,809,472 B1 | 10/2010 | Silva et al. |
| 7,827,963 B2 | 11/2010 | Li et al. |
| 7,847,790 B2 | 12/2010 | Bewley et al. |
| 7,861,941 B2 | 1/2011 | Schultz et al. |
| 7,870,080 B2 | 1/2011 | Budike, Jr. |
| 7,886,166 B2 | 2/2011 | Shnekendorf et al. |
| 7,898,147 B2 | 3/2011 | Grabinger et al. |
| 7,904,209 B2 | 3/2011 | Podgorny et al. |
| 7,934,504 B2 | 5/2011 | Lowe et al. |
| 7,949,615 B2 | 5/2011 | Ehlers et al. |
| 7,963,454 B2 | 6/2011 | Sullivan et al. |
| D642,081 S | 7/2011 | Kashimoto |
| 7,979,164 B2 | 7/2011 | Garozzo et al. |
| 8,005,576 B2 | 8/2011 | Rodgers |
| 8,024,054 B2 | 9/2011 | Mairs et al. |
| 8,032,254 B2 | 10/2011 | Amundson et al. |
| 8,042,049 B2 | 10/2011 | Killian et al. |

(56) References Cited

U.S. PATENT DOCUMENTS

| | | |
|---|---|---|
| D648,641 S | 11/2011 | Wallaert |
| D648,642 S | 11/2011 | Wallaert |
| 8,050,801 B2 | 11/2011 | Richards et al. |
| 8,082,068 B2 | 12/2011 | Rodgers |
| 8,083,154 B2 | 12/2011 | Schultz et al. |
| 8,087,593 B2 | 1/2012 | Leen |
| 8,091,796 B2 | 1/2012 | Amundson et al. |
| 8,099,178 B2 | 1/2012 | Mairs et al. |
| 8,103,390 B2 | 1/2012 | Rodgers |
| 8,112,181 B2 | 2/2012 | Remsburg |
| 8,116,917 B2 | 2/2012 | Rodgers |
| 8,122,110 B1 | 2/2012 | Wilbur et al. |
| 8,127,060 B2 | 2/2012 | Doll et al. |
| 8,167,216 B2 | 5/2012 | Schultz et al. |
| 8,183,995 B2 | 5/2012 | Wang et al. |
| 8,219,249 B2 | 7/2012 | Harrod et al. |
| 8,224,491 B2 | 7/2012 | Koster et al. |
| 8,239,066 B2 | 8/2012 | Jennings et al. |
| 8,239,073 B2 | 8/2012 | Fausak et al. |
| 8,244,383 B2 | 8/2012 | Bergman et al. |
| 8,255,086 B2 | 8/2012 | Grohman |
| 8,255,090 B2 | 8/2012 | Frader-Thompson |
| 8,352,081 B2 | 1/2013 | Grohman |
| 8,437,877 B2 | 5/2013 | Grohman |
| 8,452,906 B2 | 5/2013 | Grohman |
| 8,463,442 B2 | 6/2013 | Curry et al. |
| 8,463,443 B2 | 6/2013 | Grohman et al. |
| 8,548,630 B2 | 10/2013 | Grohman |
| 8,564,400 B2 | 10/2013 | Grohman |
| 2001/0025349 A1 | 9/2001 | Sharood et al. |
| 2001/0034586 A1 | 10/2001 | Ewert et al. |
| 2001/0048376 A1 | 12/2001 | Maeda et al. |
| 2001/0055311 A1 | 12/2001 | Trachewsky et al. |
| 2002/0002425 A1 | 1/2002 | Dossey et al. |
| 2002/0013897 A1 | 1/2002 | McTernan et al. |
| 2002/0016639 A1 | 2/2002 | Smith et al. |
| 2002/0022894 A1 | 2/2002 | Eryurek et al. |
| 2002/0026476 A1 | 2/2002 | Miyazaki et al. |
| 2002/0033252 A1 | 3/2002 | Sasao et al. |
| 2002/0048194 A1 | 4/2002 | Klein |
| 2002/0053047 A1 | 5/2002 | Gold |
| 2002/0072814 A1 | 6/2002 | Schuler et al. |
| 2002/0091784 A1 | 7/2002 | Baker et al. |
| 2002/0104323 A1 | 8/2002 | Rash et al. |
| 2002/0116550 A1 | 8/2002 | Hansen |
| 2002/0123896 A1 | 9/2002 | Diez et al. |
| 2002/0124211 A1 | 9/2002 | Gray et al. |
| 2002/0143523 A1 | 10/2002 | Balaji et al. |
| 2002/0152298 A1 | 10/2002 | Kikta et al. |
| 2002/0157054 A1 | 10/2002 | Shin et al. |
| 2002/0163427 A1 | 11/2002 | Eryurek et al. |
| 2002/0178288 A1 | 11/2002 | McLeod |
| 2002/0190242 A1 | 12/2002 | Iillie et al. |
| 2002/0191026 A1 | 12/2002 | Rodden et al. |
| 2002/0191603 A1 | 12/2002 | Shin et al. |
| 2002/0198990 A1 | 12/2002 | Bradfield et al. |
| 2003/0058863 A1 | 3/2003 | Oost |
| 2003/0061340 A1 | 3/2003 | Sun et al. |
| 2003/0078677 A1 | 4/2003 | Hull et al. |
| 2003/0088338 A1 | 5/2003 | Phillips et al. |
| 2003/0097482 A1 | 5/2003 | DeHart et al. |
| 2003/0108064 A1 | 6/2003 | Bilke et al. |
| 2003/0109963 A1 | 6/2003 | Oppedisano et al. |
| 2003/0115177 A1 | 6/2003 | Takanabe et al. |
| 2003/0116637 A1 | 6/2003 | Ellingham |
| 2003/0154355 A1 | 8/2003 | Fernandez |
| 2003/0179721 A1 | 9/2003 | Shurmantine et al. |
| 2003/0191857 A1 | 10/2003 | Terrell et al. |
| 2003/0206100 A1 | 11/2003 | Richman et al. |
| 2003/0229784 A1 | 12/2003 | Cuellar et al. |
| 2004/0001478 A1 | 1/2004 | Wong |
| 2004/0003051 A1 | 1/2004 | Krzyzanowski et al. |
| 2004/0003415 A1 | 1/2004 | Ng |
| 2004/0024483 A1 | 2/2004 | Holcombe |
| 2004/0025089 A1 | 2/2004 | Haswarey et al. |
| 2004/0039478 A1 | 2/2004 | Kiesel et al. |
| 2004/0059815 A1 | 3/2004 | Buckingham et al. |
| 2004/0066788 A1 | 4/2004 | Lin et al. |
| 2004/0088069 A1 | 5/2004 | Singh |
| 2004/0095237 A1 | 5/2004 | Chen et al. |
| 2004/0104942 A1 | 6/2004 | Weigel |
| 2004/0107717 A1 | 6/2004 | Yoon et al. |
| 2004/0111186 A1 | 6/2004 | Rossi et al. |
| 2004/0111254 A1 | 6/2004 | Gogel et al. |
| 2004/0117330 A1 | 6/2004 | Ehlers et al. |
| 2004/0133314 A1 | 7/2004 | Ehlers et al. |
| 2004/0133704 A1 | 7/2004 | Krzyzanowski |
| 2004/0138981 A1 | 7/2004 | Ehlers et al. |
| 2004/0139038 A1 | 7/2004 | Ehlers et al. |
| 2004/0143360 A1 | 7/2004 | Kiesel et al. |
| 2004/0146008 A1 | 7/2004 | Conradt et al. |
| 2004/0148482 A1 | 7/2004 | Grundy et al. |
| 2004/0156360 A1 | 8/2004 | Sexton et al. |
| 2004/0159112 A1 | 8/2004 | Jayanth et al. |
| 2004/0189590 A1 | 9/2004 | Mehaffey et al. |
| 2004/0204775 A1 | 10/2004 | Keyes et al. |
| 2004/0205781 A1 | 10/2004 | Hill et al. |
| 2004/0206096 A1 | 10/2004 | Jayanth |
| 2004/0210348 A1 | 10/2004 | Imhof et al. |
| 2004/0218591 A1 | 11/2004 | Ogawa et al. |
| 2004/0222307 A1 | 11/2004 | DeLuca |
| 2004/0236471 A1 | 11/2004 | Poth |
| 2004/0245352 A1 | 12/2004 | Smith et al. |
| 2004/0260427 A1 | 12/2004 | Wimsatt |
| 2004/0260812 A1 | 12/2004 | Rhodes et al. |
| 2004/0260927 A1 | 12/2004 | Grobman |
| 2004/0266491 A1 | 12/2004 | Howard et al. |
| 2004/0267385 A1 | 12/2004 | Lingemann |
| 2004/0267395 A1 | 12/2004 | Discenzo et al. |
| 2004/0267790 A1 | 12/2004 | Pak et al. |
| 2005/0005249 A1 | 1/2005 | Hill et al. |
| 2005/0007249 A1 | 1/2005 | Eryurek et al. |
| 2005/0010759 A1 | 1/2005 | Wakiyama |
| 2005/0033707 A1 | 2/2005 | Ehlers et al. |
| 2005/0034023 A1 | 2/2005 | Maturana et al. |
| 2005/0040247 A1 | 2/2005 | Pouchak |
| 2005/0040250 A1 | 2/2005 | Wruck |
| 2005/0041033 A1 | 2/2005 | Hilts et al. |
| 2005/0041633 A1 | 2/2005 | Roeser et al. |
| 2005/0046584 A1 | 3/2005 | Breed |
| 2005/0051168 A1 | 3/2005 | DeVries et al. |
| 2005/0054381 A1 | 3/2005 | Lee et al. |
| 2005/0055427 A1 | 3/2005 | Frutiger et al. |
| 2005/0068978 A1 | 3/2005 | Sexton et al. |
| 2005/0073789 A1 | 4/2005 | Tanis |
| 2005/0076150 A1 | 4/2005 | Lee et al. |
| 2005/0080879 A1 | 4/2005 | Kim et al. |
| 2005/0081156 A1 | 4/2005 | Clark et al. |
| 2005/0081157 A1 | 4/2005 | Clark et al. |
| 2005/0090915 A1 | 4/2005 | Geiwitz |
| 2005/0096872 A1 | 5/2005 | Blevins et al. |
| 2005/0097478 A1 | 5/2005 | Killian et al. |
| 2005/0103874 A1 | 5/2005 | Erdman |
| 2005/0109048 A1 | 5/2005 | Lee |
| 2005/0116023 A1 | 6/2005 | Amundson et al. |
| 2005/0118996 A1 | 6/2005 | Lee et al. |
| 2005/0119765 A1 | 6/2005 | Bergman |
| 2005/0119766 A1 | 6/2005 | Amundson et al. |
| 2005/0119771 A1 | 6/2005 | Amundson et al. |
| 2005/0119793 A1 | 6/2005 | Amundson et al. |
| 2005/0119794 A1 | 6/2005 | Amundson et al. |
| 2005/0120012 A1 | 6/2005 | Poth et al. |
| 2005/0125495 A1 | 6/2005 | Tjong et al. |
| 2005/0143138 A1 | 6/2005 | Lee et al. |
| 2005/0145705 A1 | 7/2005 | Shah et al. |
| 2005/0150967 A1 | 7/2005 | Chapman, Jr. et al. |
| 2005/0154494 A1 | 7/2005 | Ahmed |
| 2005/0159848 A1 | 7/2005 | Shah et al. |
| 2005/0159924 A1 | 7/2005 | Shah et al. |
| 2005/0161517 A1 | 7/2005 | Helt et al. |
| 2005/0166610 A1 | 8/2005 | Jayanth |
| 2005/0176410 A1 | 8/2005 | Brooking et al. |
| 2005/0182498 A1 | 8/2005 | Landou et al. |
| 2005/0192727 A1 | 9/2005 | Shostak et al. |

(56) References Cited

U.S. PATENT DOCUMENTS

| | | |
|---|---|---|
| 2005/0193155 A1 | 9/2005 | Fujita |
| 2005/0198040 A1 | 9/2005 | Cohen et al. |
| 2005/0223339 A1 | 10/2005 | Lee |
| 2005/0229610 A1 | 10/2005 | Park et al. |
| 2005/0235661 A1 | 10/2005 | Pham |
| 2005/0235662 A1 | 10/2005 | Pham |
| 2005/0235663 A1 | 10/2005 | Pham |
| 2005/0240312 A1 | 10/2005 | Terry et al. |
| 2005/0252673 A1* | 11/2005 | Kregle et al. .................. 174/58 |
| 2005/0256591 A1 | 11/2005 | Rule et al. |
| 2005/0256935 A1 | 11/2005 | Overstreet et al. |
| 2005/0258257 A1 | 11/2005 | Thurman, Jr. et al. |
| 2005/0258259 A1 | 11/2005 | Stanimirovic |
| 2005/0270151 A1 | 12/2005 | Winick |
| 2005/0278071 A1 | 12/2005 | Durham, III |
| 2005/0280364 A1 | 12/2005 | Omura et al. |
| 2005/0281368 A1 | 12/2005 | Droba et al. |
| 2005/0288823 A1 | 12/2005 | Hesse et al. |
| 2006/0006244 A1 | 1/2006 | Morrow et al. |
| 2006/0009861 A1 | 1/2006 | Bonasia et al. |
| 2006/0009863 A1 | 1/2006 | Lingemann |
| 2006/0021358 A1 | 2/2006 | Nallapa |
| 2006/0021359 A1 | 2/2006 | Hur et al. |
| 2006/0027671 A1 | 2/2006 | Shah |
| 2006/0030954 A1 | 2/2006 | Bergman et al. |
| 2006/0036350 A1 | 2/2006 | Bohrer et al. |
| 2006/0036952 A1 | 2/2006 | Yang |
| 2006/0041898 A1 | 2/2006 | Potyrailo et al. |
| 2006/0045107 A1 | 3/2006 | Kucenas et al. |
| 2006/0048064 A1 | 3/2006 | Vronay |
| 2006/0058924 A1 | 3/2006 | Shah |
| 2006/0063523 A1 | 3/2006 | McFarland et al. |
| 2006/0090142 A1 | 4/2006 | Glasgow et al. |
| 2006/0090483 A1 | 5/2006 | Kim et al. |
| 2006/0091227 A1 | 5/2006 | Attridge, Jr. |
| 2006/0092977 A1 | 5/2006 | Bai et al. |
| 2006/0105697 A1 | 5/2006 | Aronstam et al. |
| 2006/0106791 A1 | 5/2006 | Morrow et al. |
| 2006/0108432 A1 | 5/2006 | Mattheis |
| 2006/0111816 A1 | 5/2006 | Spalink et al. |
| 2006/0130497 A1 | 6/2006 | Kang et al. |
| 2006/0144055 A1 | 7/2006 | Ahn |
| 2006/0144232 A1 | 7/2006 | Kang et al. |
| 2006/0149414 A1 | 7/2006 | Archacki, Jr. et al. |
| 2006/0150027 A1 | 7/2006 | Paden |
| 2006/0153247 A1 | 7/2006 | Stumer |
| 2006/0155398 A1 | 7/2006 | Hoffberg et al. |
| 2006/0158051 A1 | 7/2006 | Bartlett et al. |
| 2006/0159007 A1 | 7/2006 | Frutiger et al. |
| 2006/0168522 A1 | 7/2006 | Bala |
| 2006/0185818 A1 | 8/2006 | Garozzo |
| 2006/0186214 A1 | 8/2006 | Simon et al. |
| 2006/0190138 A1 | 8/2006 | Stone et al. |
| 2006/0192021 A1 | 8/2006 | Schultz et al. |
| 2006/0192022 A1* | 8/2006 | Barton et al. .................. 236/94 |
| 2006/0196953 A1 | 9/2006 | Simon et al. |
| 2006/0200253 A1 | 9/2006 | Hoffberg et al. |
| 2006/0200258 A1 | 9/2006 | Hoffberg et al. |
| 2006/0200259 A1 | 9/2006 | Hoffberg et al. |
| 2006/0200260 A1 | 9/2006 | Hoffberg et al. |
| 2006/0202978 A1 | 9/2006 | Lee et al. |
| 2006/0206220 A1 | 9/2006 | Amundson |
| 2006/0209208 A1 | 9/2006 | Kim et al. |
| 2006/0212194 A1 | 9/2006 | Breed |
| 2006/0219799 A1 | 10/2006 | Schultz et al. |
| 2006/0229090 A1 | 10/2006 | LaDue |
| 2006/0235548 A1 | 10/2006 | Gaudette |
| 2006/0236351 A1 | 10/2006 | Ellerbrock et al. |
| 2006/0239296 A1 | 10/2006 | Jinzaki et al. |
| 2006/0248233 A1 | 11/2006 | Park et al. |
| 2006/0250578 A1 | 11/2006 | Pohl et al. |
| 2006/0250979 A1 | 11/2006 | Gauweiler et al. |
| 2006/0267756 A1 | 11/2006 | Kates |
| 2006/0276917 A1 | 12/2006 | Li et al. |
| 2007/0005191 A1 | 1/2007 | Sloup et al. |
| 2007/0008116 A1 | 1/2007 | Bergman et al. |
| 2007/0012052 A1 | 1/2007 | Butler et al. |
| 2007/0013534 A1 | 1/2007 | DiMaggio |
| 2007/0014233 A1 | 1/2007 | Oguro et al. |
| 2007/0016311 A1 | 1/2007 | Bergman et al. |
| 2007/0016476 A1 | 1/2007 | Hoffberg et al. |
| 2007/0019683 A1 | 1/2007 | Kryzyanowski |
| 2007/0025368 A1 | 2/2007 | Ha et al. |
| 2007/0032909 A1 | 2/2007 | Tolbert, Jr. et al. |
| 2007/0033310 A1 | 2/2007 | Kweon |
| 2007/0035255 A1 | 2/2007 | Shuster et al. |
| 2007/0040040 A1 | 2/2007 | Mueller |
| 2007/0043477 A1 | 2/2007 | Ehlers et al. |
| 2007/0043478 A1 | 2/2007 | Ehlers et al. |
| 2007/0045429 A1 | 3/2007 | Chapman, Jr. et al. |
| 2007/0045431 A1 | 3/2007 | Chapman, Jr. et al. |
| 2007/0045442 A1 | 3/2007 | Chapman, Jr. et al. |
| 2007/0051818 A1 | 3/2007 | Atlas |
| 2007/0053513 A1 | 3/2007 | Hoffberg |
| 2007/0055407 A1 | 3/2007 | Goldberg et al. |
| 2007/0055757 A1 | 3/2007 | Mairs et al. |
| 2007/0067062 A1 | 3/2007 | Mairs et al. |
| 2007/0067496 A1 | 3/2007 | Deiretsbacher et al. |
| 2007/0073973 A1 | 3/2007 | Hazay |
| 2007/0080235 A1 | 4/2007 | Fulton, Jr. |
| 2007/0083721 A1 | 4/2007 | Grinspan |
| 2007/0084937 A1 | 4/2007 | Ahmed |
| 2007/0088883 A1 | 4/2007 | Wakabayashi |
| 2007/0089090 A1 | 4/2007 | Riedl et al. |
| 2007/0090199 A1 | 4/2007 | Hull et al. |
| 2007/0093226 A1 | 4/2007 | Foltyn et al. |
| 2007/0097993 A1 | 5/2007 | Bojahra et al. |
| 2007/0102149 A1 | 5/2007 | Kates |
| 2007/0109114 A1 | 5/2007 | Farley et al. |
| 2007/0109975 A1 | 5/2007 | Reckamp et al. |
| 2007/0113247 A1 | 5/2007 | Kwak |
| 2007/0114291 A1 | 5/2007 | Pouchak |
| 2007/0119957 A1 | 5/2007 | Kates |
| 2007/0119958 A1 | 5/2007 | Kates |
| 2007/0129820 A1 | 6/2007 | Glanzer et al. |
| 2007/0129825 A1 | 6/2007 | Kargenian |
| 2007/0129826 A1 | 6/2007 | Kreidler et al. |
| 2007/0129917 A1 | 6/2007 | Blevins et al. |
| 2007/0130834 A1 | 6/2007 | Kande et al. |
| 2007/0130969 A1 | 6/2007 | Peterson et al. |
| 2007/0131784 A1 | 6/2007 | Garozzo et al. |
| 2007/0135692 A1 | 6/2007 | Hwang et al. |
| 2007/0135946 A1 | 6/2007 | Sugiyama et al. |
| 2007/0136669 A1 | 6/2007 | Kwon et al. |
| 2007/0136687 A1 | 6/2007 | Pak |
| 2007/0138307 A1 | 6/2007 | Khoo |
| 2007/0138308 A1 | 6/2007 | Schultz et al. |
| 2007/0143704 A1 | 6/2007 | Laird-McConnell |
| 2007/0143707 A1 | 6/2007 | Yun et al. |
| 2007/0157016 A1 | 7/2007 | Dayan et al. |
| 2007/0158442 A1 | 7/2007 | Chapman, Jr. et al. |
| 2007/0168887 A1 | 7/2007 | Lee |
| 2007/0177505 A1 | 8/2007 | Charrua et al. |
| 2007/0191024 A1 | 8/2007 | Kim et al. |
| 2007/0192731 A1 | 8/2007 | Townsend et al. |
| 2007/0194138 A9 | 8/2007 | Shah |
| 2007/0204637 A1 | 9/2007 | Fujii et al. |
| 2007/0205297 A1 | 9/2007 | Finkam et al. |
| 2007/0205916 A1 | 9/2007 | Blom et al. |
| 2007/0208461 A1 | 9/2007 | Chase |
| 2007/0208549 A1 | 9/2007 | Blevins et al. |
| 2007/0213853 A1 | 9/2007 | Glanzer et al. |
| 2007/0219645 A1 | 9/2007 | Thomas et al. |
| 2007/0220301 A1 | 9/2007 | Brundridge et al. |
| 2007/0220907 A1 | 9/2007 | Ehlers |
| 2007/0221741 A1 | 9/2007 | Wagner et al. |
| 2007/0223500 A1 | 9/2007 | Lee et al. |
| 2007/0225868 A1 | 9/2007 | Terlson et al. |
| 2007/0225869 A1 | 9/2007 | Amundson et al. |
| 2007/0233323 A1 | 10/2007 | Wiemeyer et al. |
| 2007/0236156 A1 | 10/2007 | Lys et al. |
| 2007/0237032 A1 | 10/2007 | Rhee et al. |
| 2007/0238413 A1 | 10/2007 | Coutts |
| 2007/0239658 A1 | 10/2007 | Cunningham et al. |

(56) References Cited

U.S. PATENT DOCUMENTS

| | | |
|---|---|---|
| 2007/0240226 A1 | 10/2007 | Song et al. |
| 2007/0241203 A1 | 10/2007 | Wagner et al. |
| 2007/0242058 A1 | 10/2007 | Yamada |
| 2007/0245306 A1 | 10/2007 | Dameshek et al. |
| 2007/0257120 A1 | 11/2007 | Chapman, Jr. et al. |
| 2007/0257121 A1 | 11/2007 | Chapman et al. |
| 2007/0260782 A1 | 11/2007 | Shaikli |
| 2007/0260978 A1 | 11/2007 | Oh et al. |
| 2007/0266329 A1 | 11/2007 | Gaudette |
| 2007/0268667 A1* | 11/2007 | Moorer et al. ............. 361/695 |
| 2007/0271521 A1 | 11/2007 | Harriger et al. |
| 2007/0274093 A1 | 11/2007 | Haim et al. |
| 2007/0277013 A1 | 11/2007 | Rexha et al. |
| 2007/0278320 A1 | 12/2007 | Lunacek et al. |
| 2007/0284452 A1 | 12/2007 | Butler et al. |
| 2007/0299857 A1 | 12/2007 | Gwozdz et al. |
| 2007/0300064 A1 | 12/2007 | Isaacs et al. |
| 2008/0003845 A1 | 1/2008 | Hong et al. |
| 2008/0004727 A1 | 1/2008 | Glanzer et al. |
| 2008/0005428 A1 | 1/2008 | Maul et al. |
| 2008/0006709 A1 | 1/2008 | Ashworth et al. |
| 2008/0012437 A1 | 1/2008 | Kabata et al. |
| 2008/0013259 A1* | 1/2008 | Barton et al. ............. 361/679 |
| 2008/0029610 A1 | 2/2008 | Nichols |
| 2008/0031147 A1 | 2/2008 | Fieremans et al. |
| 2008/0040351 A1 | 2/2008 | Jin et al. |
| 2008/0048045 A1 | 2/2008 | Butler et al. |
| 2008/0048046 A1 | 2/2008 | Wagner et al. |
| 2008/0054082 A1 | 3/2008 | Evans et al. |
| 2008/0055190 A1 | 3/2008 | Lee |
| 2008/0056722 A1 | 3/2008 | Hendrix et al. |
| 2008/0057872 A1 | 3/2008 | McFarland et al. |
| 2008/0057931 A1 | 3/2008 | Nass et al. |
| 2008/0058996 A1 | 3/2008 | Sachdev et al. |
| 2008/0059682 A1 | 3/2008 | Cooley et al. |
| 2008/0062892 A1 | 3/2008 | Dodgen et al. |
| 2008/0063006 A1 | 3/2008 | Nichols |
| 2008/0065926 A1 | 3/2008 | Poth et al. |
| 2008/0072704 A1 | 3/2008 | Clark et al. |
| 2008/0073440 A1 | 3/2008 | Butler et al. |
| 2008/0077884 A1 | 3/2008 | Patitucci |
| 2008/0077886 A1 | 3/2008 | Eichner |
| 2008/0082767 A1 | 4/2008 | Nulkar et al. |
| 2008/0083009 A1 | 4/2008 | Kaler et al. |
| 2008/0083834 A1 | 4/2008 | Krebs et al. |
| 2008/0097651 A1 | 4/2008 | Shah et al. |
| 2008/0104189 A1 | 5/2008 | Baker et al. |
| 2008/0114500 A1 | 5/2008 | Hull et al. |
| 2008/0120335 A1 | 5/2008 | Dolgoff |
| 2008/0121729 A1 | 5/2008 | Gray |
| 2008/0128523 A1 | 6/2008 | Hoglund et al. |
| 2008/0129475 A1 | 6/2008 | Breed et al. |
| 2008/0133033 A1 | 6/2008 | Wolff et al. |
| 2008/0133060 A1 | 6/2008 | Hoglund et al. |
| 2008/0133061 A1 | 6/2008 | Hoglund et al. |
| 2008/0134087 A1 | 6/2008 | Hoglund et al. |
| 2008/0134098 A1 | 6/2008 | Hoglund et al. |
| 2008/0144302 A1* | 6/2008 | Rosenblatt ............. 361/809 |
| 2008/0148098 A1 | 6/2008 | Chen |
| 2008/0161976 A1 | 7/2008 | Stanimirovic |
| 2008/0161977 A1 | 7/2008 | Takach et al. |
| 2008/0161978 A1 | 7/2008 | Shah |
| 2008/0167931 A1 | 7/2008 | Gerstemeier et al. |
| 2008/0168255 A1 | 7/2008 | Abou-Emara et al. |
| 2008/0168356 A1 | 7/2008 | Eryurek et al. |
| 2008/0173035 A1 | 7/2008 | Thayer et al. |
| 2008/0183335 A1 | 7/2008 | Poth et al. |
| 2008/0184059 A1 | 7/2008 | Chen |
| 2008/0185976 A1 | 8/2008 | Dickey et al. |
| 2008/0186160 A1 | 8/2008 | Kim et al. |
| 2008/0192649 A1 | 8/2008 | Pyeon et al. |
| 2008/0192745 A1 | 8/2008 | Spears |
| 2008/0195254 A1 | 8/2008 | Jung et al. |
| 2008/0195581 A1 | 8/2008 | Ashmore et al. |
| 2008/0195687 A1 | 8/2008 | Jung et al. |
| 2008/0198036 A1 | 8/2008 | Songkakul et al. |
| 2008/0215987 A1 | 9/2008 | Alexander et al. |
| 2008/0216461 A1 | 9/2008 | Nakano et al. |
| 2008/0217418 A1 | 9/2008 | Helt et al. |
| 2008/0217419 A1 | 9/2008 | Ehlers et al. |
| 2008/0223944 A1 | 9/2008 | Helt et al. |
| 2008/0235611 A1 | 9/2008 | Fraley et al. |
| 2008/0256475 A1 | 10/2008 | Amundson et al. |
| 2008/0264085 A1 | 10/2008 | Perry et al. |
| 2008/0272934 A1 | 11/2008 | Wang et al. |
| 2008/0281472 A1 | 11/2008 | Podgorny et al. |
| 2008/0294274 A1 | 11/2008 | Laberge et al. |
| 2008/0294932 A1 | 11/2008 | Oshins et al. |
| 2009/0001180 A1 | 1/2009 | Siddaramanna et al. |
| 2009/0001182 A1 | 1/2009 | Siddaramanna et al. |
| 2009/0049847 A1 | 2/2009 | Butler et al. |
| 2009/0052105 A1 | 2/2009 | Soleimani et al. |
| 2009/0057424 A1 | 3/2009 | Sullivan et al. |
| 2009/0057425 A1 | 3/2009 | Sullivan et al. |
| 2009/0062964 A1 | 3/2009 | Sullivan et al. |
| 2009/0065597 A1 | 3/2009 | Garozzo et al. |
| 2009/0077423 A1 | 3/2009 | Kim et al. |
| 2009/0094506 A1 | 4/2009 | Lakkis |
| 2009/0105846 A1 | 4/2009 | Hesse et al. |
| 2009/0113037 A1 | 4/2009 | Pouchak |
| 2009/0119092 A1 | 5/2009 | Balasubramanyan |
| 2009/0132091 A1 | 5/2009 | Chambers et al. |
| 2009/0140056 A1 | 6/2009 | Leen |
| 2009/0140057 A1 | 6/2009 | Leen |
| 2009/0140058 A1 | 6/2009 | Koster et al. |
| 2009/0140061 A1 | 6/2009 | Schultz et al. |
| 2009/0140062 A1 | 6/2009 | Amundson et al. |
| 2009/0140063 A1 | 6/2009 | Koster et al. |
| 2009/0140064 A1 | 6/2009 | Schultz et al. |
| 2009/0143879 A1 | 6/2009 | Amundson et al. |
| 2009/0143880 A1 | 6/2009 | Amundson et al. |
| 2009/0143916 A1 | 6/2009 | Boll et al. |
| 2009/0143918 A1 | 6/2009 | Amundson et al. |
| 2009/0157529 A1 | 6/2009 | Ehlers et al. |
| 2009/0195349 A1 | 8/2009 | Frader-Thompson |
| 2009/0198810 A1 | 8/2009 | Bayer et al. |
| 2009/0245278 A1 | 10/2009 | Kee |
| 2009/0257431 A1 | 10/2009 | Ramanathan et al. |
| 2009/0259785 A1 | 10/2009 | Perry et al. |
| 2009/0261174 A1 | 10/2009 | Butler et al. |
| 2009/0261767 A1 | 10/2009 | Butler et al. |
| 2009/0266904 A1 | 10/2009 | Cohen |
| 2009/0267540 A1 | 10/2009 | Chemel et al. |
| 2009/0271336 A1 | 10/2009 | Franks |
| 2009/0287736 A1 | 11/2009 | Shike et al. |
| 2010/0011437 A1 | 1/2010 | Courtney |
| 2010/0023865 A1 | 1/2010 | Fulker et al. |
| 2010/0050075 A1 | 2/2010 | Thorson et al. |
| 2010/0050108 A1 | 2/2010 | Mirza |
| 2010/0063644 A1 | 3/2010 | Kansal et al. |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070907 A1 | 3/2010 | Harrod et al. |
| 2010/0073159 A1 | 3/2010 | Schmickley et al. |
| 2010/0076605 A1 | 3/2010 | Harrod et al. |
| 2010/0100253 A1 | 4/2010 | Fausak et al. |
| 2010/0101854 A1 | 4/2010 | Wallaert et al. |
| 2010/0102136 A1 | 4/2010 | Hadzidedic et al. |
| 2010/0102948 A1 | 4/2010 | Grohman et al. |
| 2010/0102973 A1 | 4/2010 | Grohman et al. |
| 2010/0106305 A1 | 4/2010 | Pavlak et al. |
| 2010/0106307 A1 | 4/2010 | Grohman et al. |
| 2010/0106308 A1 | 4/2010 | Filbeck et al. |
| 2010/0106309 A1 | 4/2010 | Grohman et al. |
| 2010/0106310 A1 | 4/2010 | Grohman |
| 2010/0106311 A1 | 4/2010 | Wallaert |
| 2010/0106312 A1 | 4/2010 | Grohman et al. |
| 2010/0106313 A1 | 4/2010 | Grohman et al. |
| 2010/0106314 A1 | 4/2010 | Grohman et al. |
| 2010/0106315 A1 | 4/2010 | Grohman |
| 2010/0106316 A1 | 4/2010 | Curry et al. |
| 2010/0106317 A1 | 4/2010 | Grohman et al. |
| 2010/0106318 A1 | 4/2010 | Grohman et al. |

(56) References Cited

U.S. PATENT DOCUMENTS

| | | |
|---|---|---|
| 2010/0106319 A1 | 4/2010 | Grohman et al. |
| 2010/0106320 A1 | 4/2010 | Grohman et al. |
| 2010/0106321 A1 | 4/2010 | Hadzidedic |
| 2010/0106322 A1 | 4/2010 | Grohman |
| 2010/0106323 A1 | 4/2010 | Wallaert |
| 2010/0106324 A1 | 4/2010 | Grohman |
| 2010/0106325 A1 | 4/2010 | Grohman |
| 2010/0106326 A1 | 4/2010 | Grohman |
| 2010/0106327 A1 | 4/2010 | Grohman et al. |
| 2010/0106329 A1 | 4/2010 | Grohman |
| 2010/0106330 A1 | 4/2010 | Grohman |
| 2010/0106333 A1 | 4/2010 | Grohman et al. |
| 2010/0106334 A1 | 4/2010 | Grohman et al. |
| 2010/0106787 A1 | 4/2010 | Grohman |
| 2010/0106809 A1 | 4/2010 | Grohman |
| 2010/0106810 A1 | 4/2010 | Grohman |
| 2010/0106814 A1 | 4/2010 | Hadzidedic et al. |
| 2010/0106815 A1 | 4/2010 | Grohman et al. |
| 2010/0106925 A1 | 4/2010 | Grohman et al. |
| 2010/0106957 A1 | 4/2010 | Grohman et al. |
| 2010/0107007 A1 | 4/2010 | Grohman et al. |
| 2010/0107070 A1 | 4/2010 | Devineni et al. |
| 2010/0107071 A1 | 4/2010 | Pavlak et al. |
| 2010/0107072 A1 | 4/2010 | Mirza et al. |
| 2010/0107073 A1 | 4/2010 | Wallaert |
| 2010/0107074 A1 | 4/2010 | Pavlak et al. |
| 2010/0107076 A1 | 4/2010 | Grohman |
| 2010/0107083 A1 | 4/2010 | Grohman |
| 2010/0107103 A1 | 4/2010 | Wallaert |
| 2010/0107109 A1 | 4/2010 | Filbeck et al. |
| 2010/0107110 A1 | 4/2010 | Mirza |
| 2010/0107111 A1 | 4/2010 | Mirza |
| 2010/0107112 A1 | 4/2010 | Jennings et al. |
| 2010/0107232 A1 | 4/2010 | Grohman et al. |
| 2010/0115364 A1 | 5/2010 | Grohman |
| 2010/0131884 A1 | 5/2010 | Shah |
| 2010/0142526 A1 | 6/2010 | Wong |
| 2010/0145528 A1 | 6/2010 | Bergman et al. |
| 2010/0145629 A1 | 6/2010 | Botich et al. |
| 2010/0168924 A1 | 7/2010 | Tessier et al. |
| 2010/0169419 A1 | 7/2010 | DeVilbiss et al. |
| 2010/0179696 A1 | 7/2010 | Grohman et al. |
| 2010/0211546 A1 | 8/2010 | Grohman et al. |
| 2010/0241245 A1 | 9/2010 | Wiemeyer et al. |
| 2010/0259931 A1 | 10/2010 | Chemel et al. |
| 2010/0264846 A1 | 10/2010 | Chemel et al. |
| 2010/0270933 A1 | 10/2010 | Chemel et al. |
| 2010/0272102 A1 | 10/2010 | Kobayashi |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301772 A1 | 12/2010 | Hahnlen et al. |
| 2010/0301773 A1 | 12/2010 | Chemel et al. |
| 2010/0301774 A1 | 12/2010 | Chemel et al. |
| 2010/0305761 A1 | 12/2010 | Remsburg |
| 2010/0314458 A1 | 12/2010 | Votaw et al. |
| 2010/0319362 A1 | 12/2010 | Hisaoka |
| 2011/0001436 A1 | 1/2011 | Chemel et al. |
| 2011/0001438 A1 | 1/2011 | Chemel et al. |
| 2011/0004823 A1 | 1/2011 | Wallaert |
| 2011/0004824 A1 | 1/2011 | Thorson et al. |
| 2011/0007016 A1 | 1/2011 | Mirza et al. |
| 2011/0007017 A1 | 1/2011 | Wallaert |
| 2011/0010620 A1 | 1/2011 | Mirza et al. |
| 2011/0010621 A1 | 1/2011 | Wallaert |
| 2011/0010652 A1 | 1/2011 | Wallaert |
| 2011/0010653 A1 | 1/2011 | Wallaert et al. |
| 2011/0010660 A1 | 1/2011 | Thorson et al. |
| 2011/0032932 A2 | 2/2011 | Pyeon et al. |
| 2011/0040785 A1 | 2/2011 | Steenberg et al. |
| 2011/0061014 A1 | 3/2011 | Frader-Thompson et al. |
| 2011/0063126 A1 | 3/2011 | Kennedy et al. |
| 2011/0066297 A1 | 3/2011 | Saberi et al. |
| 2011/0137467 A1 | 6/2011 | Leen et al. |
| 2011/0160915 A1 | 6/2011 | Bergman et al. |
| 2011/0251726 A1 | 10/2011 | McNulty et al. |
| 2012/0012662 A1 | 1/2012 | Leen et al. |
| 2012/0046792 A1 | 2/2012 | Secor |
| 2012/0065805 A1 | 3/2012 | Montalvo |
| 2012/0116593 A1 | 5/2012 | Amundson et al. |
| 2012/0181010 A1 | 7/2012 | Schultz et al. |

FOREIGN PATENT DOCUMENTS

| | | | | |
|---|---|---|---|---|
| EP | 2241836 A1 | 10/2010 | | |
| EP | 2241837 A1 | 10/2010 | | |
| GB | 2117573 A | * | 10/1983 | ............... H02G 3/12 |
| WO | 02056540 A2 | 7/2002 | | |
| WO | 2008100641 A1 | 8/2008 | | |

OTHER PUBLICATIONS

Definition of track from TheFreeDictionary.com Mar. 12, 2013.*
Definition of track from Macmillan Dictionary.com Mar. 12, 2013.*
GB2117573A provided in Office Action.*
Definition of "encase" from www.thefreedictionary.com Nov. 21, 2013.*
Related case U.S. Appl. No. 29/345,748, filed Oct. 21, 2009 to Timothy Wallaert et al., entitled "Thin Cover Plate for an Electronic System Controller".
Related case U.S. Appl. No. 29/345,747, filed Oct. 21, 2009 to Timothy Wallaert et al., entitled "Thin Cover Plate for an Electronic System Controller".
Related case U.S. Appl. No. 12/603,450, filed Oct. 21, 2009 to Wojciech Grohman, entitled "Alarm and Diagnostics System and Method for a Distributed-Architecture Heating, Ventilation and Air Conditioning Network".
Related case U.S. Appl. No. 12/603,382, filed Oct. 21, 2009 to Wojciech Grohman, entitled "Device Abstraction System and Method for a Distributed-Architecture Heating, Ventilation and Air Conditioning System".
Related case U.S. Appl. No. 12/603,504, filed Oct. 21, 2009 to Wojciech Grohman, entitled "Device Abstraction System and Method for a Distributed-Architecture Heating, Ventilation and Air Conditioning System".
Related case U.S. Appl. No. 12/603,449, filed Oct. 21, 2009 to Amanda Filbeck et al., entitled "System and Method of Use for a User Interface Dashboard of a Heating, Ventilation and Air Conditioning Network".
Related case U.S. Appl. No. 12/603,460, filed Oct. 21, 2009 to Wojciech Grohman et al., entitled "System and Method of Use for a User Interface Dashboard of a Heating, Ventilation and Air Conditioning Network".
Related case U.S. Appl. No. 12/603,526, filed Oct. 21, 2009 to Wojciech Grohman et al., entitled. "Communication Protocol System and Methof for a Distributed-Architecture Heating, Ventilation and Air Conditioning Network".
Related case U.S. Appl. No. 12/603,532, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,475, filed Oct. 21, 2009 to Suresh Kumar Devineni et al., entitled "System and Method of Use for a User Interface Dashboard of a Heating, Ventilation and Air Conditioning Network".
Related case U.S. Appl. No. 12/603,362, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,473, filed Oct. 21, 2009 to Wojciech Grohman et al., entitled "System and Method for Zoning a Distributed-Architecture Heating, Ventilation and Air Conditioning Network".

(56) References Cited

OTHER PUBLICATIONS

Related case U.S. Appl. No. 12/603,407, filed Oct. 21, 2009 to Amanda Filbeck et al., entitled "System and Method for Zoning a Distributed-Architecture Heating, Ventilation and Air Conditioning Network".
Related case U.S. Appl. No. 12/603,496, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,482, filed Oct. 21, 2009 to Muhammad Mirza et al., entitled "System and Method of Use for a User Interface Dashboard of a Heating, Ventilation and Air Conditioning Network".
Related case U.S. Appl. No. 12/603,488, filed Oct. 21, 2009 to Muhammad Mirza et al., entitled "System and Method of Use for a User Interface Dashboard of a Heating, Ventilation and Air Conditioning Network".
Related case U.S. Appl. No. 12/603,495, filed Oct. 21, 2009 to Thomas Pavlak et al., entitled "System and Method of Use for a User Interface Dashboard of a Heating, Ventilation and Air Conditioning Network".
Related case U.S. Appl. No. 12/603,497, filed Oct. 21, 2009 to Muhammad Mirza et al., entitled "System and Method of Use for a User Interface Dashboard of a Heating, Ventilation and Air Conditioning Network".
Related case U.S. Appl. No. 12/603,431, filed Oct. 21, 2009 to Wojciech Grohman et al., entitled "General Control Technique in a Heating, Ventilation and Air Conditioning Network".
Related case U.S. Appl. No. 12/603,502, filed Oct. 21, 2009 to Jacob Jennings et al., entitled "System and Method of Use for a User Interface Dashboard of a Heating, Ventilation and Air Conditioning Network".
Related case U.S. Appl. No. 12/603,489, filed Oct. 21, 2009 to Wojciech Grohman et al., entitled "System and Method for Zoning a Distributed-Architecture Heating, Ventilation and Air Conditioning Network".
Related case U.S. Appl. No. 12/603,527, filed Oct. 21, 2009 to Darko Hadzidedic, entitled "Memory Recovery Scheme and Data Structure in a Heating, Ventilation and Air Conditioning Network".
Related case U.S. Appl. No. 12/603,479, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,536, filed Oct. 21, 2009 to Timothy Wallaert et al., entitled "Communication Protocol System and Method for a Distributed-Architecture Heating, Ventilation and Air Conditioning Network".
Related case U.S. Appl. No. 12/603,509, filed Oct. 21, 2009 to Timothy Wallaert et al., entitled "System and Method of Use for a User Interface Dashboard of a Heating, Ventilation and Air Conditioning Network".
Related case U.S. Appl. No. 12/603,512, filed Oct. 21, 2009 to Wojciech Grohman et al., entitled "Programming and Configuration in a Heating, Ventilation and Air Conditioning Network".
Related case U.S. Appl. No. 12/603,464, filed Oct. 21, 2009 to Wojciech Grohman et al., entitled "Alarm and Diagnostics System and Method for a Distributed-Architecture Heating, Ventilation and Air Conditioning Network".
Related case U.S. Appl. No. 12/603,528, filed Oct. 21, 2009 to Wojciech Grohman et al., entitled "Memory Recovery Scheme and Data Structure in a Heating, Ventilation and Air Conditioning Network".
Related case U.S. Appl. No. 12/603,525, filed Oct. 21, 2009 to Wojciech Grohman et al., entitled "Method of Controlling Equipment in a Heating, Ventilation and Air Conditioning Network".
Related case U.S. Appl. No. 12/603,520, filed Oct. 21, 2009 to Darko Hadzidedic et al., entitled "Alarm and Diagnostics System and Method for a Distributed-Architecture Heating, Ventilation and Air Conditioning Network".
Related case U.S. Appl. No. 12/603,539, filed Oct. 21, 2009 to Wojciech Grohman et al., entitled "Communication Protocol System and Method for a Distributed-Architecture Heating, Ventilation and Air Conditioning Network".
Related case U.S. Appl. No. 12/603,420, filed Oct. 21, 2009 to Darko Hadzidedic et al., entitled "Alarm and Diagnostics System and Method for a Distributed-Architecture Heating, Ventilation and Air Conditioning Network".
Related case U.S. Appl. No. 12/603,483, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,514, filed Oct. 21, 2009 to Thomas Pavlak et al., entitled "System and Method of Use for a User Interface Dashboard of a Heating, Ventilation and Air Conditioning Network".
Related case U.S. Appl. No. 12/603,515, filed Oct. 21, 2009 to Wojciech Grohman et al., entitled "Alarm and Diagnostics System and Method for a Distributed-Architecture Heating, Ventilation and Air Conditioning Network".
Related case U.S. Appl. No. 12/603,490, filed Oct. 21, 2009 to Wojciech Grohman, entitled "System Recovery in a Heating, Ventilation and Air Conditioning Network".
Related case U.S. Appl. No. 12/603,523, filed Oct. 21, 2009 to Wojciech Grohman et al., entitled "Alarm and Diagnostics System and Method for a Distributed-Architecture Heating, Ventilation and Air Conditioning".
Related case U.S. Appl. No. 12/603,493, filed Oct. 21, 2009 to Wojciech Grohman et al., entitled "System Recovery in a Heating, Ventilation and Air Conditioning Network".
Related case U.S. Appl. No. 12/603,547, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,531, filed Oct. 21, 2009 to Wojciech Grohman, entitled "Memory Recovery Scheme and Data Structure in a Heating, Ventilation and Air Conditioning Network".
Related case U.S. Appl. No. 12/603,555, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,562, filed Oct. 21, 2009 to Wojciech Grohman et al., entitled "Communication Protocol System and Method for a Distributed-Architecture Heating, Ventilation and Air Conditioning Network".
Related case U.S. Appl. No. 12/603,566, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,451, filed Oct. 21, 2009 to Timothy Wallaert, entitled "Alarm and Diagnostics System and Method for a Distributed-Architecture Heating, Ventilation and Air Conditioning Network".
Related case U.S. Appl. No. 12/603,553, filed Oct. 21, 2009 to Wojciech Grohman et al., entitled "Communication Protocol System and Method for a Distributed-Architecture Heating, Ventilation and Air Conditioning Network".
Related case U.S. Appl. No. 12/603,487, filed Oct. 21, 2009 to Wojciech Grohman, entitled "System Recovery in a Heating, Ventilation and Air Conditioning Network".
Related case U.S. Appl. No. 12/603,558, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,468, filed Oct. 21, 2009 to Wojciech Grohman, entitled "Programming and Configuration in a Heating, Ventilation and Air Conditioning Network".
Related case U.S. Appl. No. 12/603,560, filed Oct. 21, 2009 to Wojciech Grohman, entitled "Communication Protocol System and Method for a Distributed-Architecture Heating, Ventilation and Air Conditioning Network".

(56) References Cited

OTHER PUBLICATIONS

Related case U.S. Appl. No. 12/603,519, filed Oct. 21, 2009 to Thomas Pavlak, entitled "System and Method of Use for a User Interface Dashboard of a Heating, Ventilation and Air Conditioning Network".

Related case U.S. Appl. No. 12/603,499, filed Oct. 21, 2009 to Jimmy Curry et al., entitled "Alarm and Diagnostics System and Method for a Distributed-Architechture Heating, Ventilation and Air Conditioning Network".

Related case U.S. Appl. No. 12/603,508, filed Oct. 21, 2009 to Wojciech Grohman, entitled "Alarm and Diagnostics System and Method for a Distributed-Architecture Heating, Ventilation and Air Conditioning Network".

Checket-Hanks, B., "Zoning Controls for Convenience's Sakes, High-End Residential Controls Move Into New Areas," Air Conditioning, Heating & Refrigeration News, ABI /INFORM Global, Jun. 28, 2004, 3 pages.

Leeb, G., "A User Interface for Home-Net," IEEE Transactions on Consumer Electronics, vol. 40, Issue 4, Nov. 1994, pp. 897-902.

"IPMI—Intelligent Platform Management Interface Specification v1.5," Document Revision 1.1, Intel Hewlett-Packard NEC Dell, Feb. 20, 2002, 460 pages.

Nash, H., "Fire Alarm Systems for Health Care Facilities," IEEE Transactions on Industry Applications, vol. 1A-19, No. 5, Sep./ Oct. 1983, pp. 848-852.

Bruggeman, E., et al., "A Multifunction Home Control System," IEEE Transactions on Consumer Electronics, CE-29, Issue 1, 10 pages.

Fischer, H., et al., "Remote Building Management and DDc-Technology to Operate Distributed HVAC-Installations," The first International Telecommunications Energy Special Conference, TELESCON '94, Apr. 11-15, 1994, pp. 127-132.

Gallas, B., et al., "Embedded Pentium® Processor System Design for Windows CE," WESCON 1998, pp. 114-123.

"iView-100 Series (iView/iView-100-40) Handheld Controller User's Manual," ICP DAS, Mar. 2006, Version 2.0.

"Spectra™ Commercial Zoning System, Engineering Data," Lennox, Bulletin No. 210366E, Oct. 2002, 33 pages.

Sharma, A., "Design of Wireless Sensors Network for Building Management Systems," University of California—Berkley, 57 pages.

"Linux Programmer's Manual," UNIX Man Pages: Login (1), http://unixhelp.ed.ac.uk/CGI/man-cgi?login, Util-linux 1.6, Nov. 4, 1996, 4 pages.

"Field Display for Tridium JACE Controllers Product Data," HVAC Concepts, Inc. 2005, 22 pages.

"HVAC Concepts," Jace Network-Installation, 2004, 2 pages.

\* cited by examiner

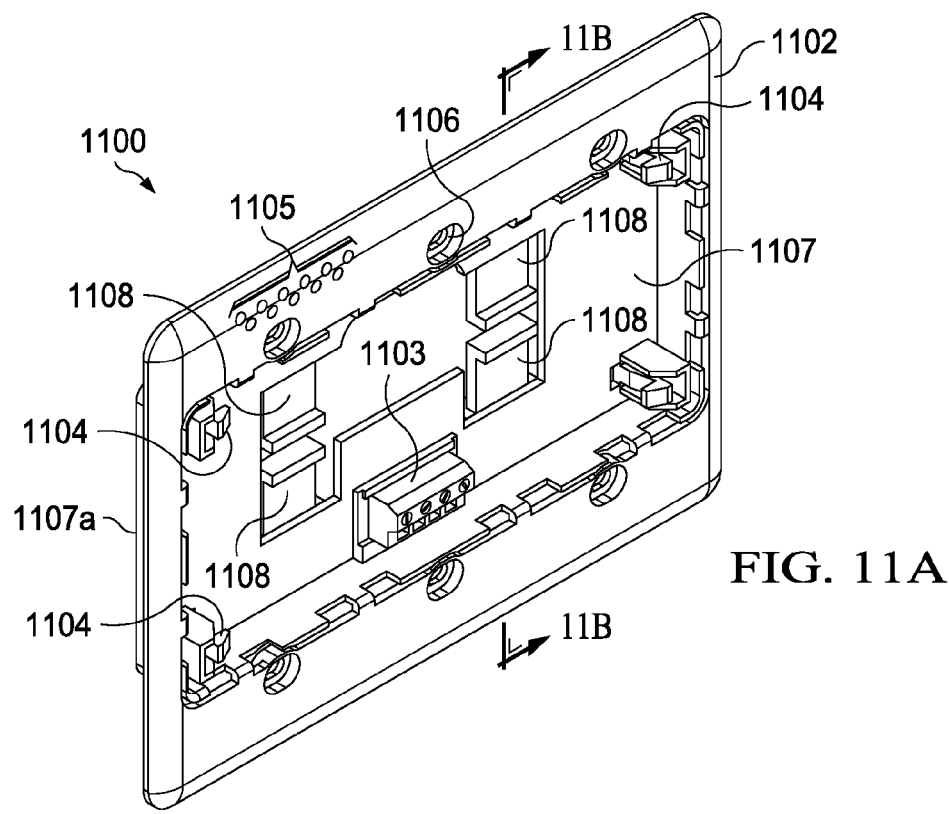
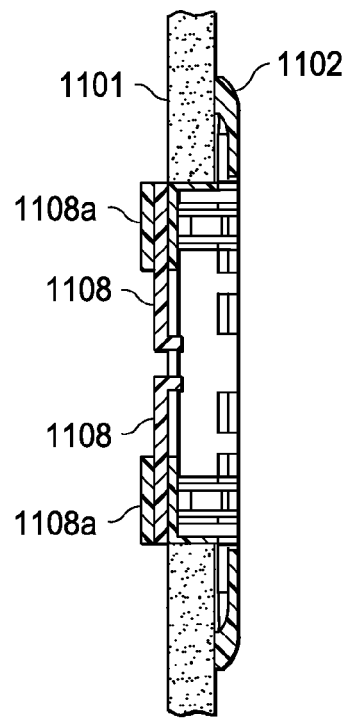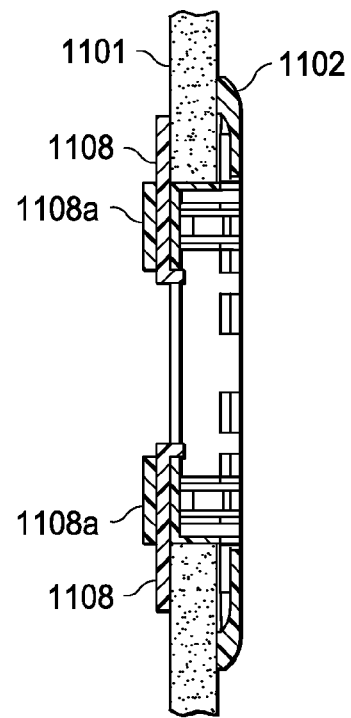
FIG. 11A
FIG. 11B          FIG. 11C

FLUSH WALL MOUNT THERMOSTAT AND IN-SET MOUNTING PLATE FOR A HEATING, VENTILATION AND AIR CONDITIONING SYSTEM

CROSS-REFERENCE TO RELATED APPLICATIONS

This application claims the benefit of U.S. Provisional Application Ser. No. 61/167,135, filed by Grohman, et al., on Apr. 6, 2009, entitled "Comprehensive HVAC Control System", and is a continuation-in-part application of application Ser. No. 12/258,659, filed by Grohman on Oct. 27, 2008, entitled "Apparatus and Method for Controlling an Environmental Conditioning Unit," both of which are commonly assigned with this application and incorporated herein by reference. This application is also related to the following U.S. patent applications, which are filed on even date herewith, commonly assigned with this application and incorporated herein by reference:

| Serial No. | Inventors | Title |
| --- | --- | --- |
| 12/603,464 | Grohman, et al. | "Alarm and Diagnostics System and Method for a Distributed-Architecture Heating, Ventilation and Air Conditioning Network" |
| U.S. Pat. No. 8,615,326 | Thorson, et al. | "System and Method of Use for a User Interface Dashboard of a Heating, Ventilation and Air Conditioning Network" |
| 12/603,382 | Grohman | "Device Abstraction System and Method for a Distributed-Architecture Heating, Ventilation and Air Conditioning Network" |
| U.S. Pat. No. 8,352,080 | Grohman, et al. | "Communication Protocol System and Method for a Distributed-Architecture Heating, Ventilation and Air Conditioning Network" |
| U.S. Pat. No. 8,295,981 | Hadzidedic | "Memory Recovery Scheme and Data Structure in a Heating, Ventilation and Air Conditioning Network" |
| U.S. Pat. No. 8,255,086 | Grohman, et al. | "System Recovery in a Heating, Ventilation and Air Conditioning Network" |
| 12/603,473 | Grohman, et al. | "System and Method for Zoning a Distributed-Architecture Heating, Ventilation and Air Conditioning Network" |
| U.S. Pat. No. 8,600,559 | Grohman, et al. | "Method of Controlling Equipment in a Heating, Ventilation and Air Conditioning Network" |
| U.S. Pat. No. 8,762,666 | Grohman, et al. | "Programming and Configuration in a Heating, Ventilation and Air Conditioning Network" |
| 12/603,431 | Mirza, et al. | "General Control Techniques in a Heating, Ventilation and Air Conditioning Network" |

TECHNICAL FIELD

This application is directed, in general, to HVAC systems and, more specifically, to a flush wall amount thermostat and mounting plate for a distributed-architecture heating, ventilation and air conditioning (HVAC) system.

BACKGROUND

Climate control systems, also referred to as HVAC systems (the two terms will be used herein interchangeably), are employed to regulate the temperature of premises, such as a residence, office, store, warehouse, vehicle, trailer, or commercial or entertainment venue. The most basic climate control systems either move air (typically by means of an air handler or, or more colloquially, a fan or blower), heat air (typically by means of a furnace or heat pump) or cool air (typically by means of a compressor-driven refrigerant loop). A wall mounted thermostat is typically included in the climate control systems to provide some level of automatic temperature control. In its simplest form, a thermostat turns the climate control system on or off as a function of a detected temperature. In a more complex form, a thermostat may take other factors, such as humidity or time, into consideration. Still, however, the operation of a thermostat remains turning the climate control system on or off in an attempt to maintain the temperature of the premises as close as possible to a desired setpoint temperature.

Climate control systems as described above have been in wide use since the middle of the twentieth century and have, to date, generally provided adequate temperature management are typically controlled by an electronic controller, such as a thermostat that is mounted on the outside surface of the wall.

SUMMARY

One aspect of this disclosure provides a flush wall mounting system for an electronic controller. This embodiment comprises a housing for receiving electrical components therein and having a front panel and a back panel coupled to the front panel. The back panel has a raised portion extending from it. This embodiment further includes a mounting plate that is removably couplable to the back panel of the housing and has front and back sides. The front side includes a flange around a perimeter thereof and has a recess formed therein configured to receive the raised portion of the back panel therein. The recess forms a raised portion extending from the back side and configured to be receivable within an opening in a wall.

In another aspect, there is provided a method of fabricating a flush wall mounting system for an electronic controller. In this embodiment, the method comprises forming a front panel of a housing for receiving electrical components therein, forming a back panel of the housing wherein the back panel has a raised portion extending from it, and forming a mounting plate that is removably couplable to the back panel. The mounting plate has front and back sides, and the front side includes a flange around a perimeter thereof and has a recess formed therein configured to receive the raised portion of the back panel therein. The recess results in a raised portion extending from the back side and is configured to be receivable within an opening in a wall.

Another embodiment is directed to a flush wall mounting plate for an electronic control system. This embodiment comprises a mounting frame including a front side having a recess formed therein configured to receive an electronic control system housing therein and a back side having a raised portion configured to be inserted into an opening in a wall. The front side includes a flange located about the front side. Movable tabs are located on an inside edge or back side of the recess and are movably coupled to the frame. The movable tabs are configured to secure the wall mounting plate within the opening when in an engaged position.

BRIEF DESCRIPTION

Reference is now made to the following descriptions taken in conjunction with the accompanying drawings, in which:

FIGS. 11A-11C illustrate another embodiment of a securing system for the mounting plate;

DETAILED DESCRIPTION

As stated above, conventional climate control systems have been in wide use since the middle of the twentieth century and have, to date, generally provided adequate temperature management. However, it has been realized that more sophisticated control and data acquisition and processing techniques may be developed and employed to improve the installation, operation and maintenance of climate control systems.

Described herein are various embodiments of an improved climate control, or HVAC, system in which at least multiple components thereof communicate with one another via a data bus. The communication allows identity, capability, status and operational data to be shared among the components. In some embodiments, the communication also allows commands to be given. As a result, the climate control system may be more flexible in terms of the number of different premises in which it may be installed, may be easier for an installer to install and configure, may be easier for a user to operate, may provide superior temperature and/or humidity control, may be more energy efficient, may be easier to diagnose and perhaps able to repair itself, may require fewer, simpler repairs and may have a longer service life.

Figure 1:
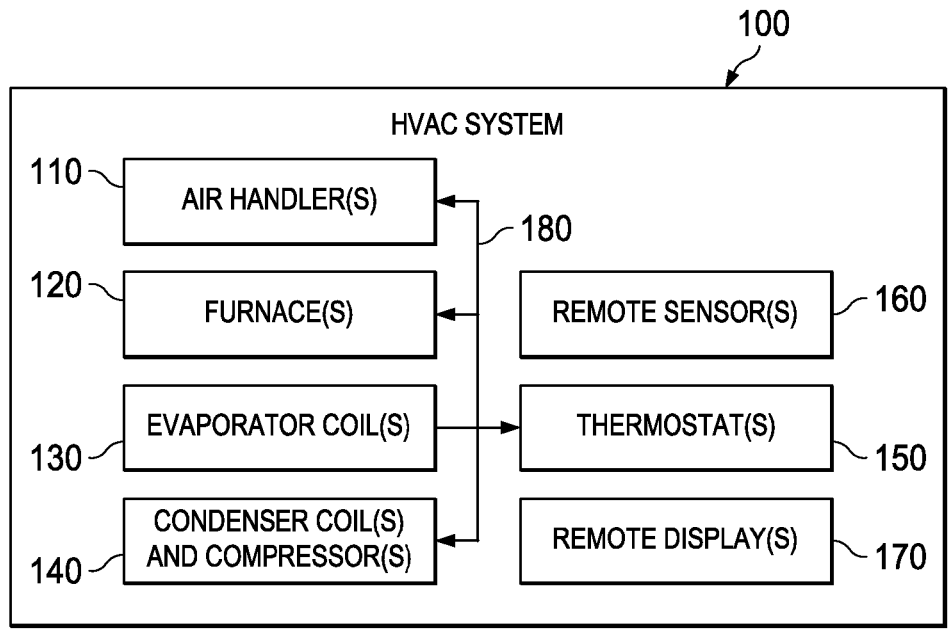
FIG. 1 is a high-level block diagram of an HVAC system within which a device abstraction system and method may be contained or carried out and in which the thermostat as provided herein may be employed.

FIG. 1 is a high-level block diagram of an HVAC system, generally designated 100, which may include indoor air quality devices, such as for example, humidifiers, dehumidifiers, UV lights, filters, ventilators, and the like. In one embodiment, the system 100 is configured to provide ventilation and therefore includes one or more air handlers 110. In an alternative embodiment, the system 100 is configured to provide heating and therefore includes one or more furnaces 120, typically associated with the one or more air handlers 110. In an alternative embodiment, the system 100 is configured to provide cooling and therefore includes one or more refrigerant evaporator coils 130, typically associated with the one or more air handlers 110. Such embodiment of the system 100 also includes one or more condenser coils 140, which are typically associated with one or more compressors in one or more so-called "outdoor units." In an alternative embodiment, the system 100 is configured to provide ventilation, heating and cooling, in which case the one or more air handlers, furnaces and evaporator coils are contained in common "indoor," e.g., attic units (not shown).

One or more thermostats 150 control one or more of the one or more air handlers 110, the one or more furnaces 120 and/or the one or more compressors 140 to regulate the temperature of the premises, at least approximately. In various embodiments to be described, the one or more thermostats provide additional functions such as operational, diagnostic and status message display and an attractive, visual interface that allows an installer, user or repairman to perform actions with respect to the system 100 more intuitively.

Although the one or more thermostats 150 typically contain temperature sensors (not shown) themselves, one or more separate, remote (indoor or outdoor) temperature sensors 160 may provide additional temperature data. Although not shown, one or more humidity sensors may be included in the system 100. Also, although the one or more thermostats 150 typically contain a display, such as a liquid crystal display (not shown), one or more separate, remote displays 170 may be included in the system 100.

Although not shown in FIG. 1, the HVAC system 100 may include one or more heat pumps in lieu of or in addition to the one or more furnaces 120, one or more evaporator coils 130 and one or more condenser coils and compressors 140. One or more humidifiers or dehumidifiers may be employed to increase or decrease humidity. One or more dampers may be used to modulate air flow through ducts (not shown). Air cleaners and lights may be used to reduce air pollution. Air quality sensors may be used to determine overall air quality.

Finally, a data bus 180, which in the illustrated embodiment is a serial bus but may include other embodiments, such as a parallel bus or wireless application, couples the one or more air handlers 110, the one or more furnaces 120, the one or more evaporator coils 130, the one or more condenser coils and compressors 140, the one or more thermostats 150, the one or more remote sensors 160 and the one or more remote displays 170 together such that data may be communicated therebetween or thereamong. The remote sensor 160 may be for temperature, humidity, particulate count, C02 count, volatile organic compound count, occupancy, motion, etc. As will be understood, the data bus 180 may be advantageously employed to convey one or more alarm messages or one or more diagnostic messages.

Figure 2:
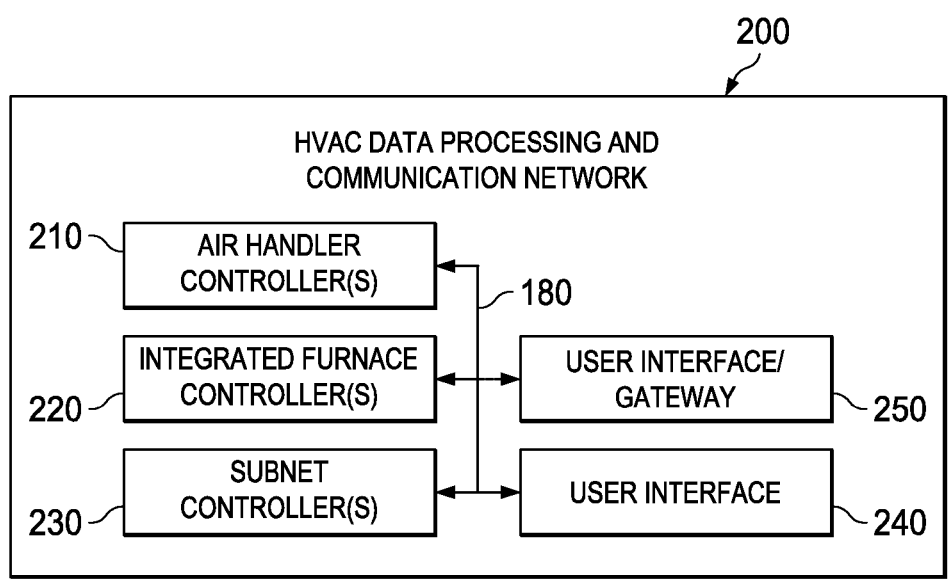
FIG. 2 is a high-level block diagram of one embodiment of an HVAC data processing and communication network 200 in which the thermostat as provided herein my be employed.

FIG. 2 is a high-level block diagram of one embodiment of an HVAC data processing and communication network 200 that may be employed in the HVAC system 100 of FIG. 1. One or more air handler controllers (AHCs) 210 may be associated with the one or more air handlers 110 of FIG. 1. One or more integrated furnace controllers (IFCs) 220 may be associated with the one or more furnaces 120, one or more evaporator coils 130 and one or more condenser coils and compressors 140 of FIG. 1. Subnet controllers (SCs) 230 may be employed to divide the network 200 into subnetworks, simplifying network configuration, communication and control. If more than one SC 230 is used in a particular network 200, one of the SCs 230 is designated as an active SC (aSC) at a time, while each of the remaining ones of the SCs 230 are designated as an inactive SC (iSC). A user interface (UI) 240 provides a means by which a person may communicate with the remainder of the network 200. In an alternative embodiment, a user interface/gateway (UI/G) 250 provides a means by which a person or other equipment may communicate with the remainder of the network 200. The serial bus 180, which is hereinafter referred to as a residential serial bus, or RSBus, provides communication between or among the aforementioned elements of the network 200. It should be understood that the use of the term "residential" is nonlimiting; the network 200 may be employed in any premises whatsoever.

Figure 3:
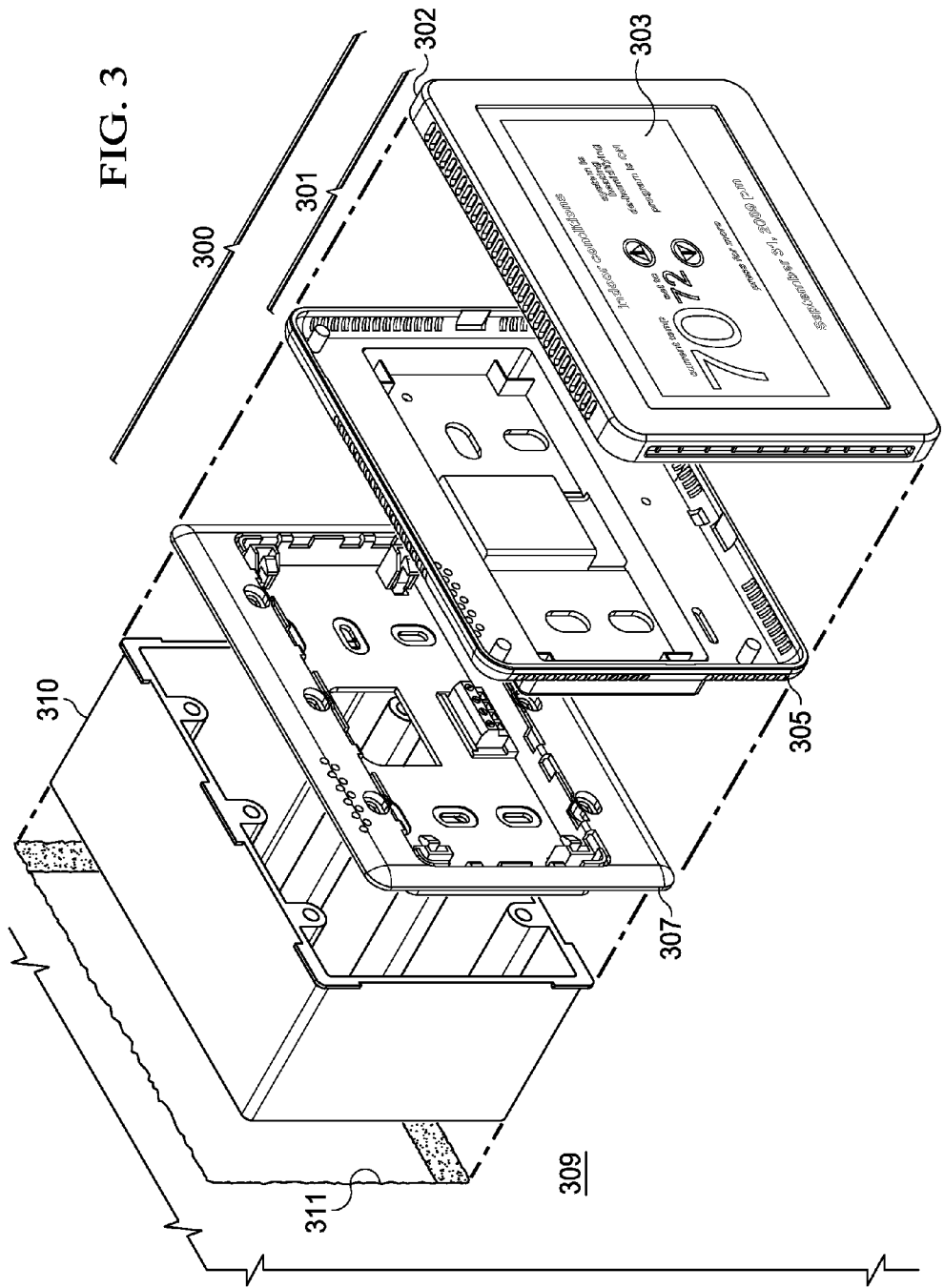
FIG. 3 illustrates an exploded view of a electronic controller and mounting plate that can be used with the HVAC system.

FIG. 3 illustrates an embodiment of an exploded view of an electronic controller 300 that can be used to control the above-described system or other similar electronic systems that might be found in a business or residence. In the illustrated embodiments set forth herein, the controller 300 is embodied as a thermostat for an HAVC system, however, it should be understood that the controller 300 could also be another type of controller, such as those for controlling entertainment systems, humidifying systems, or alarm or security systems. In the embodiment illustrated in FIG. 3, the controller 300 includes a housing 301 that includes a front panel 302 that has a controller interface 303 that allows a user to set various control parameters for the system being controlled and read output indicia. FIG. 3 illustrates a touch screen configuration, but it should be understood that the front panel 302 may also include physical buttons for setting various operating parameters for the controller 300. The housing 301 further includes a back panel 305 that may be removably coupled to the front panel 302. Typically screws, bolts, or cooperative molded snap latches can serve to hold the front panel 302 and back panel 305 together. The housing 301 contains electronic components (not shown) that are configured to interface with and control the subject system.

The controller 300 also includes a mounting plate 307 that is configured (as used in this application and claims this term means that it has a design, including electrical or physical aspects, or a geometric shape) to be removably coupled to the back panel 305 of the housing 301. Thus, it can be easily removed from the housing 301. As explained below in more detail, the mounting plate 307 has a unique configuration that, when attached to the back panel 305, allows the housing 301 to be positioned more flush with a wall 309 than previous designs. This configuration not only keeps the sensor, as close to the monitored space as possible, it also keeps the housing 301 from extending too far into the monitored space, which reduces the risk of a person inadvertently bumping into the housing 301 and injuring themselves or damaging the housing 301. In the illustrated embodiment of FIG. 3, the mounting plate 307 may be configured to be attached to an existing conventional electrical wiring box 310 contained within an opening 311 in the wall 309. However, as explained below, other embodiments allow the mounting plate 307 to be mounted to the wall 309 without the need of the electrical wiring box 310.

Figure 4A:
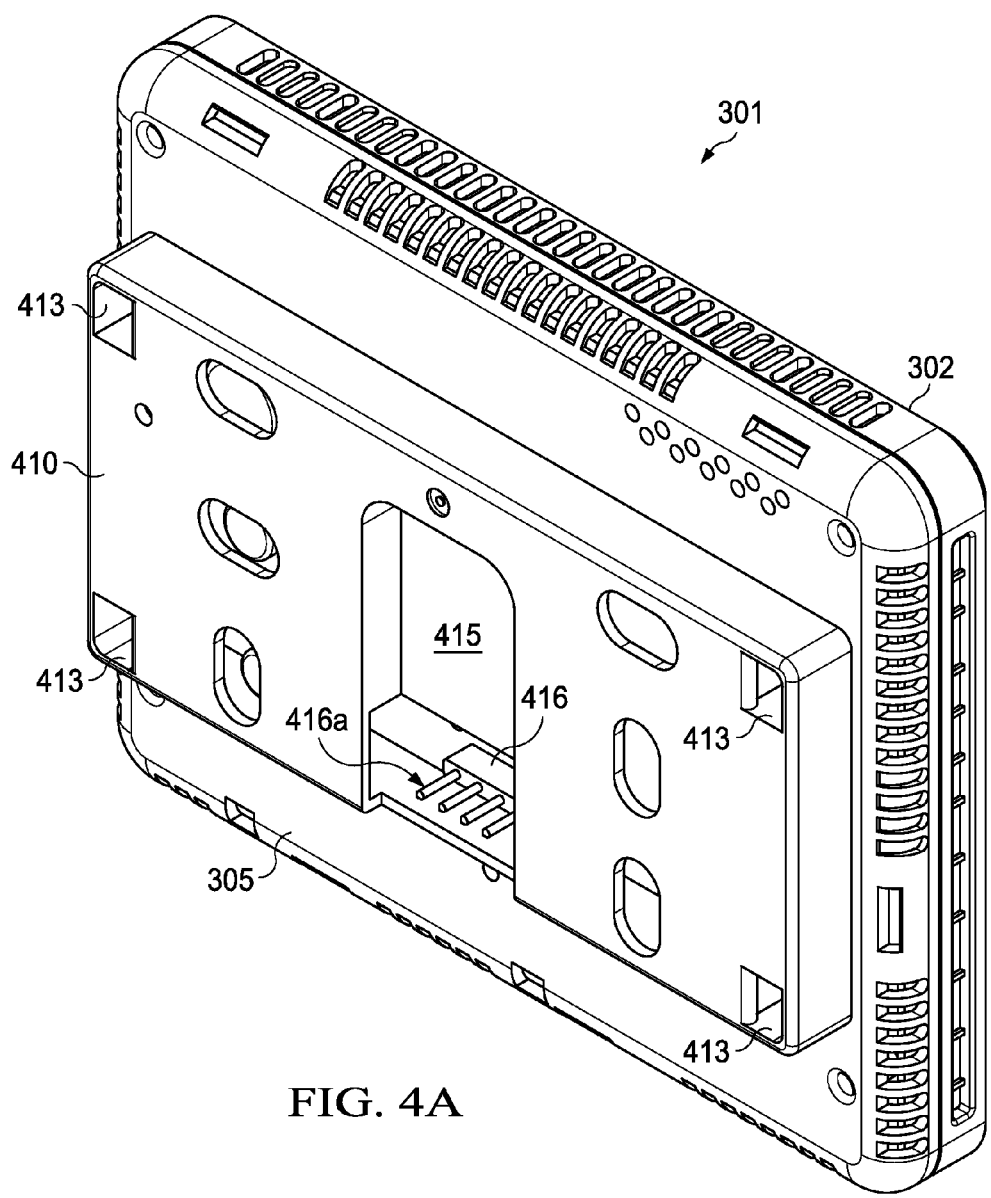
FIG. 4A illustrates a back view of the housing of the electronic controller.
Figure 4B:
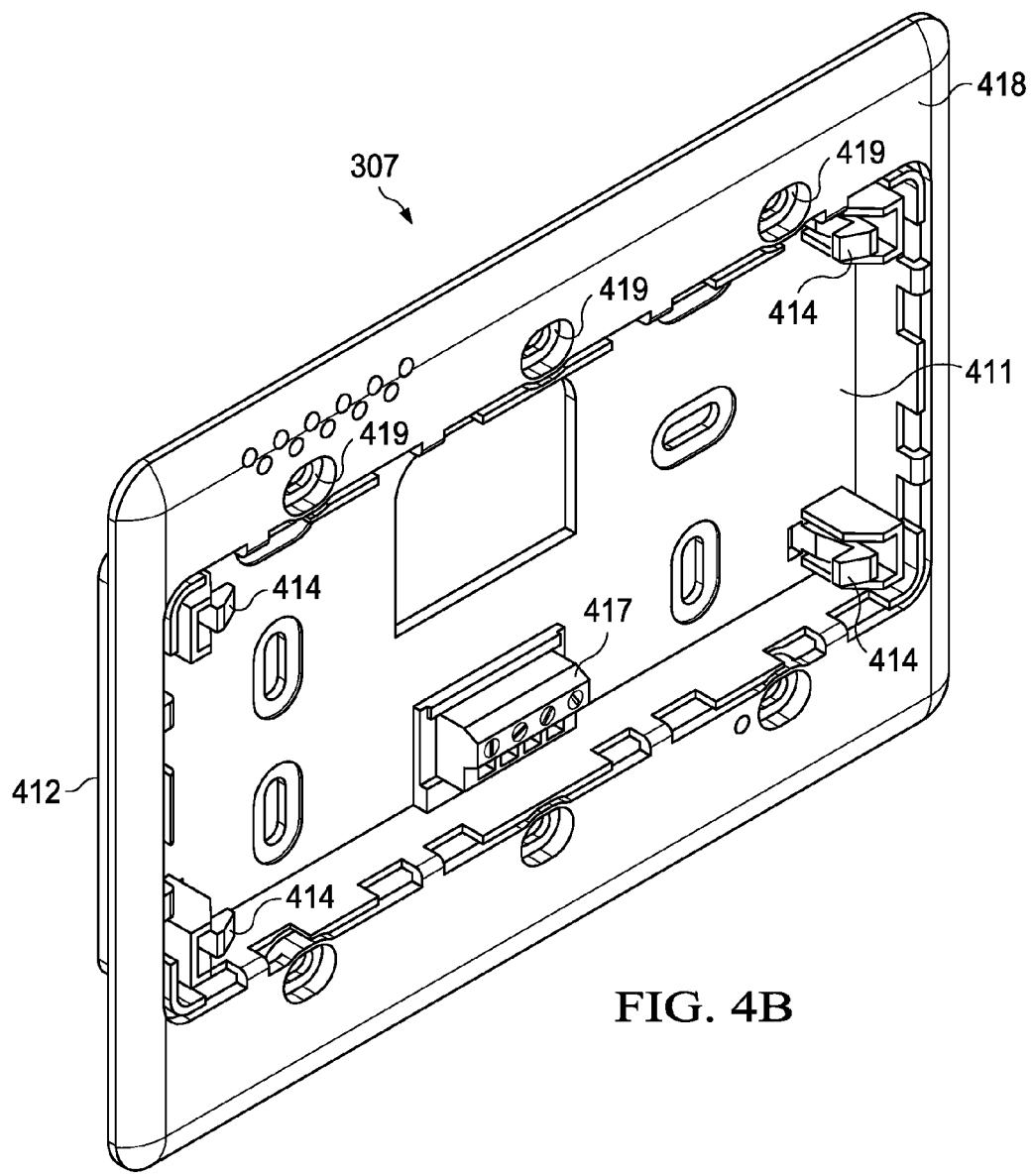
FIG. 4B illustrates a front view of a mounting plate for the housing of FIG. 4A.

FIG. 4A illustrates a back view of the housing 301, which illustrates advantageous features of this embodiment, and FIG. 4B shows a front view of the mounting plate 307. As seen in FIG. 4A, back panel 305 is coupled to front panel 302 of the housing 301. Back panel 305 includes a raised portion 410. The raised portion 410 has an overall length and width dimensions that are less than those of the back panel 305. Thus, the dimensional footprint of the raised portion 410 is smaller than the dimensional footprint of the back panel 305. The raised portion 410 is configured to be received into a recess 411 of the mounting plate 307 (FIG. 4B). The recess 411 has a dimensional footprint that is just large enough to receive the raised portion 410 therein. The recess 411 also results in a raised portion 412 on the back side of the mounting plate 307 that has substantially the same dimensional footprint as the recess 411. The raised portion 412 is configured to extend into the opening 311 of the wall 309 or into the electrical wiring box 310 (see FIG. 3). Both the housing 301 and the mounting plate 307 may be made of any type of moldable material, such as stamped metal or molded, including both form molded or injected molded materials, such as plastic or other composite materials.

In the illustrated embodiment, the raised portion 410 of the back panel 305 also includes one or more latch openings 413 that are configured to receive a corresponding latch 414 that is located within the recess 411 of the mounting plate 307. The latch or latches 414 may be a resilient snap latch of a design know to those skilled in the art. However, as mentioned below, the latch 414 may be configured as a wiring block coupled to the mounting plate 307 or housing 301 that secures the housing 301 to the mounting plate 307 when connector pins extending from the housing 301 or mounting plate 307 are received within the wiring block. In other embodiments, the number and configuration of both the latch openings 414 and latches 415 may vary and have a different configuration than that shown.

An opening 415 located in the raised portion 410 of the back panel 305 is also present in the illustrated embodiment of FIG. 4A. Located within the opening 415 is a connector pin block 416 that includes one or more connector pins 416a. The connector pins 416a are designed and positioned such that they are correspondingly received within a wiring connector block 417 located within the recess 411 of the mounting plate 307. It should be understood that in other embodiments, the components may be reversed. For example, the connector pin block 416 may be located in the recess 411 of the mounting plate 307, while the wiring connector block 417 may be located within the opening 415 in the housing 301. As explained below, electrical wires connecting the wiring connection block 417 to the controlled system and the electrical source are connected on the back side of the wiring connector block 417. Unlike conventional designs, this configuration allows for quick and easy electrical connection to the housing 301 by way of the mounting plate 307 when the housing 301 and mounting plate 307 are coupled together. Additionally, as mentioned above, it should be understood that though the wiring connector block 417 is configured to provided electrical connection, in some embodiments, the electrical wiring block 417 may also serve as the latch that secures the housing 301 to the mounting plate 307. The frictional force of connectors pins 416a coupled to the housing 301 when received within the wiring connector block 417 may be sufficient to securely hold the housing 301 to the mounting plate 307.

The mounting plate 307 also includes a flange 418 that forms an outer perimeter of the mounting plate 307. The flange 418 abuts the surface of the wall 309 when in a mounted position and covers the opening 311 (See FIG. 3). In this embodiment, the flange 418 may also include attachment openings 419 along upper and lower portions of the flange 418. These openings 419 are positioned to correspond to attachment openings in the standard electrical wiring box 310 located within the wall 309. (See FIG. 3). By way of example, a screw can be inserted through each of the openings 419 and used to attach the mounting plate 307 to an electrical wiring box, such as the one shown in FIG. 3.

Figure 5A:
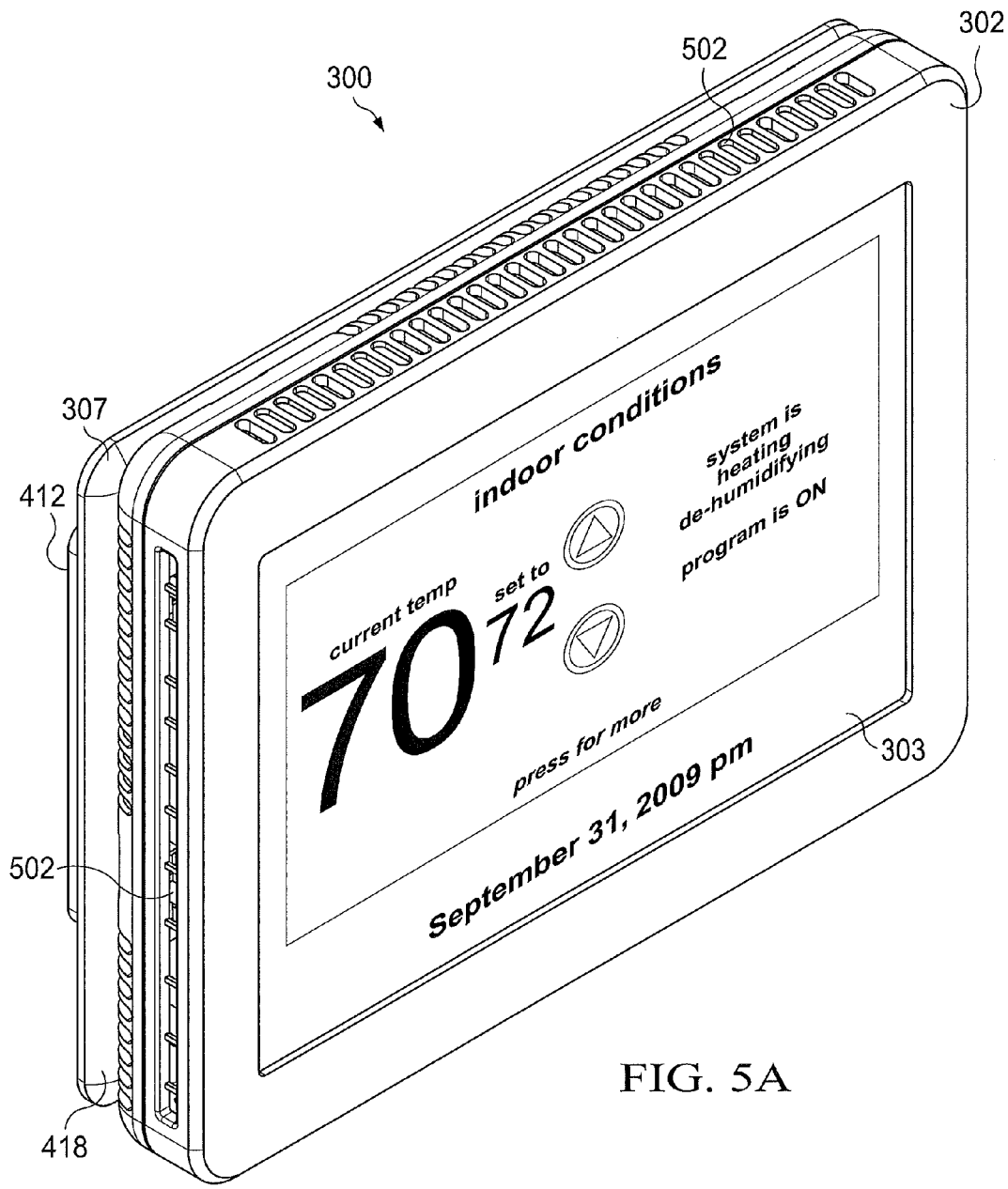
FIG. 5A illustrates a front view of the housing coupled to the mounting plate.
Figure 5B:
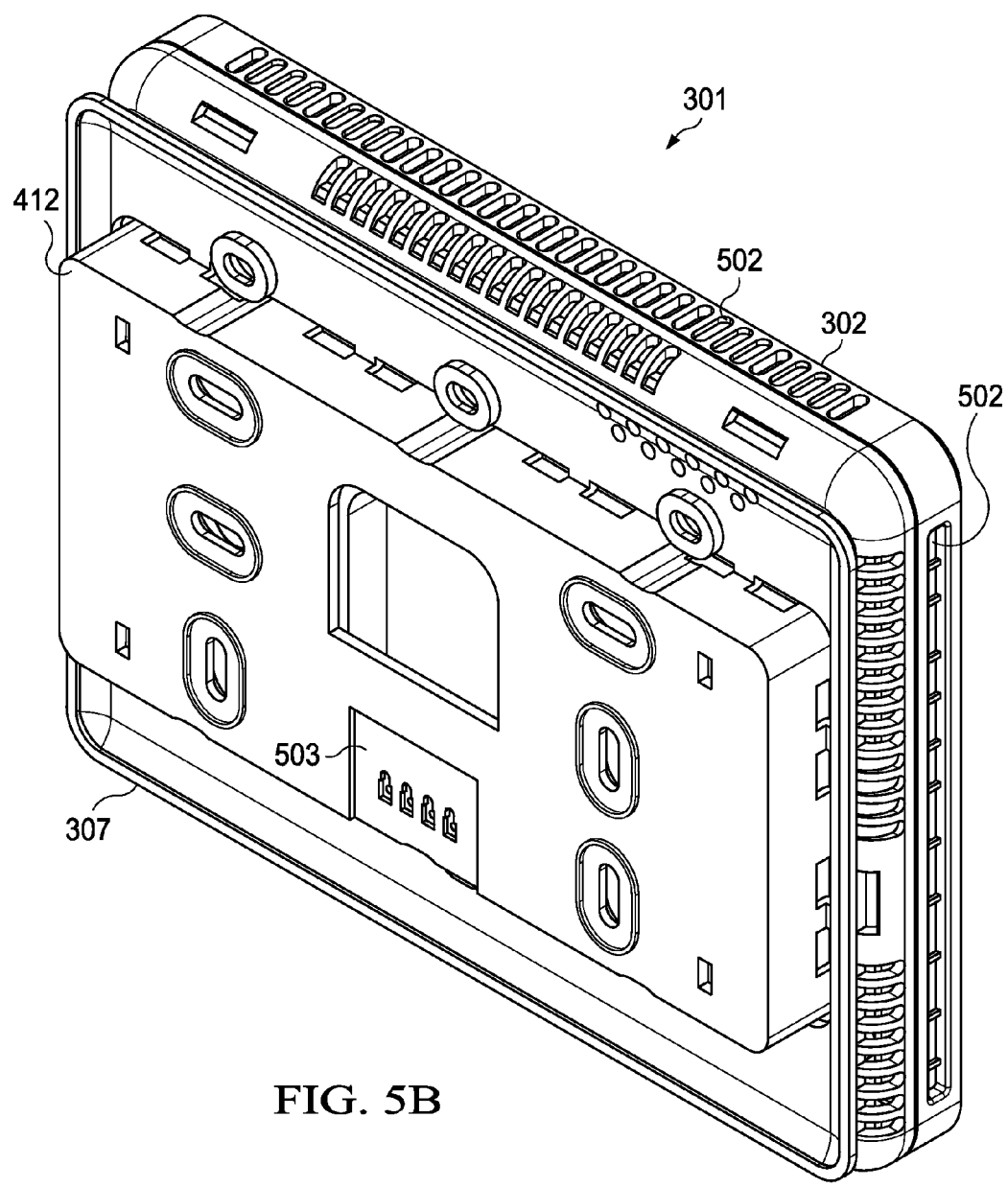
FIG. 5B illustrates a back view of the housing coupled to the mounting plate.

FIGS. 5A and 5B illustrate front and back views of the advantageous slimmer profile that is present when the housing 301 is coupled to the mounting plate 307. Since a portion of the back panel 305 resides within the recess 411 of the mounting plate 307 and extends into the wall 309 (FIG. 3), the housing 301 may have a thinner profile than conventional designs. Moreover, a particular advantage of the embodiment described herein is that when the housing 301 is coupled to the mounting plate 307, vents 502 that are located about the edges of both the front and back panels 302, 305 of the housing 301 and are substantially unobstructed by the mounting plate 307. That is, the vents 502 located on the edges of at least the back panel 302 are not covered by the mounting plate 307. Thus, this configuration not only allows for improved cooling of the electrical components within the housing 301 when compared to conventional designs, it also provides a thinner profile when compared to those same conventional designs. Further, the sensor components, such as a temperature sensor, within the housing 301 remain closer to the monitored space even though the raised portion 410 (FIG. 4A) of the back panel 305 is contained within the wall.

FIG. 5B also illustrates electrical wire terminals 503 located on the back side of the wiring connector block 417 for inserting electrical wires therein and providing electrical connection to the electrical components within the housing 301.

Figure 6:
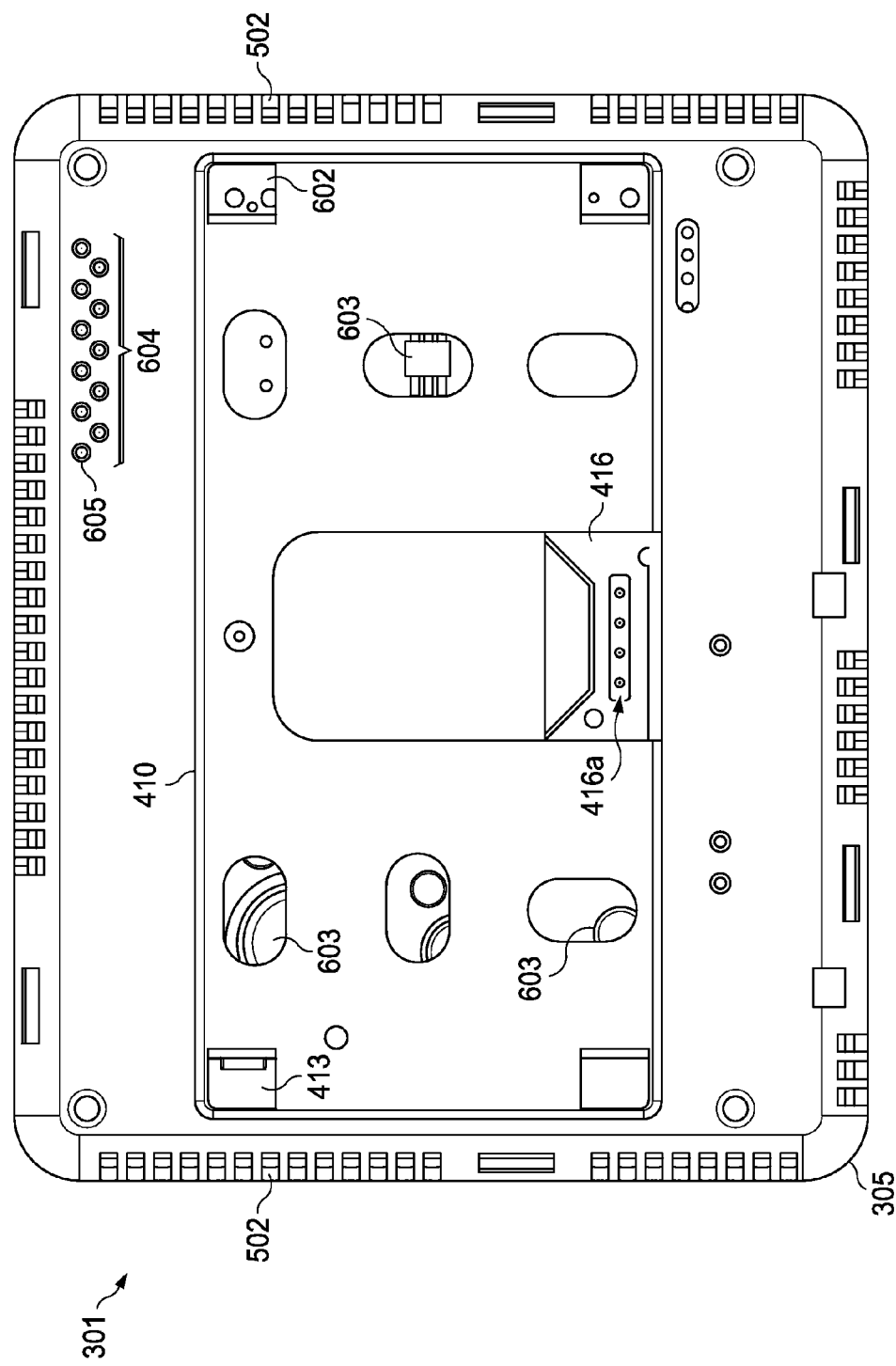
FIG. 6 illustrates a back view of the housing showing a portion of the electronic components located within the housing.

FIG. 6 shows the back panel 305 of housing 301. The components previously mentioned are designated as before, however, this view also shows the printed wiring board 602 on which the previously mentioned electrical components 603 can be seen. The printed wiring board 602 and the electrical components 603 may be of conventional design and configured to provided control of the applicable system. In addition, certain embodiments of the housing 301 may further include one or more test probe openings 604 through which a test probe may be inserted to make contact with electrical contacts 605 located on the board 602. The purpose of these openings 604 are for easy testing of the electrical circuits once the housing 301 is assembled.

Figure 7:
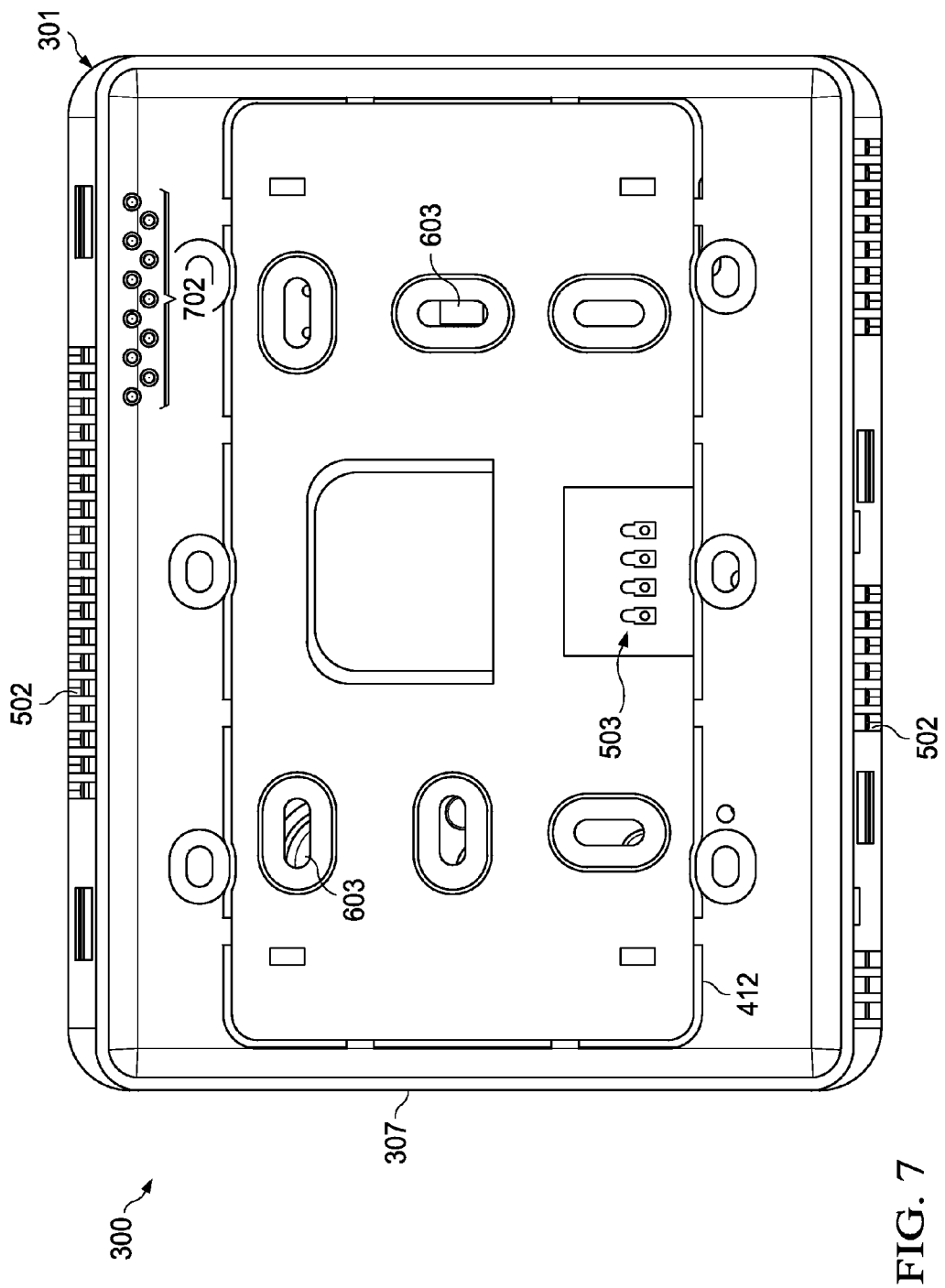
FIG. 7 illustrates a back view of the housing coupled to the mounting plate.

FIG. 7 shows a back view of the housing 301 coupled to the mounting plate 307. As seen in this view, portions of the electronic components 603 are visible through openings within the back panel 305 of the housing 301 and the mounting plate 307. The mounting plate 307 also includes one or more openings 702 that align with the openings 604 in the back panel 305 as shown in FIG. 6 when the mounting plate 307 is coupled to the housing 301. As used in this disclosure and in the claims, the holes 604, 702 are considered to be aligned as long as a test probe can be inserted through the respective opening 604 and 702 to make contact with the electrical contact 605. It should be understood that though 11 holes are shown, the disclosure is not limited to any specific number and will depend on the design being tested.

Figure 8A:
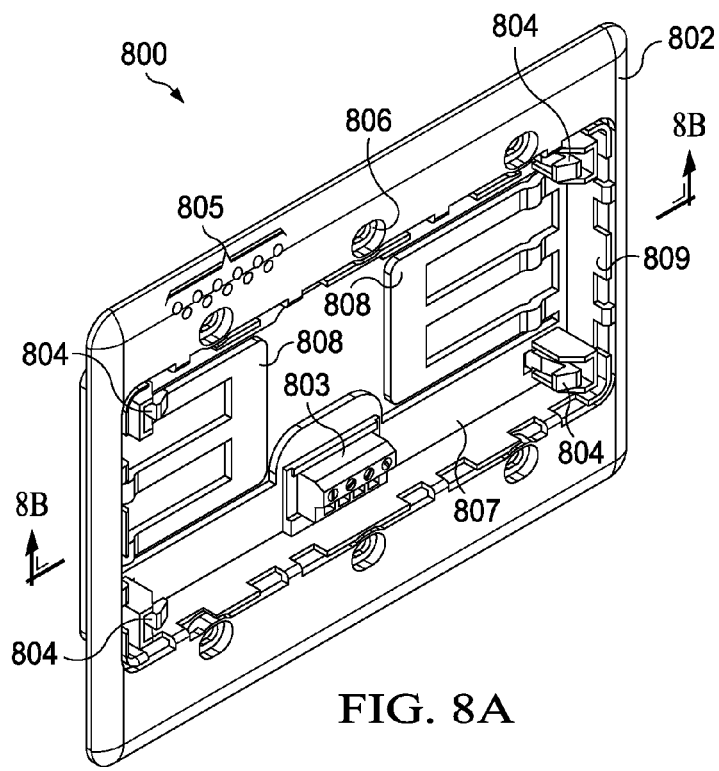
FIGS. 8A-8C illustrate one embodiment of a securing system for the mounting plate.
Figure 8B:
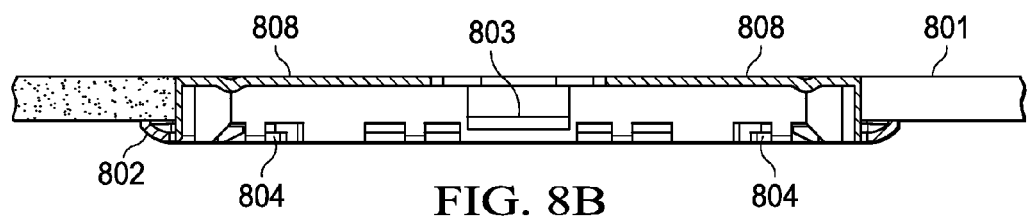
Figure 8C:
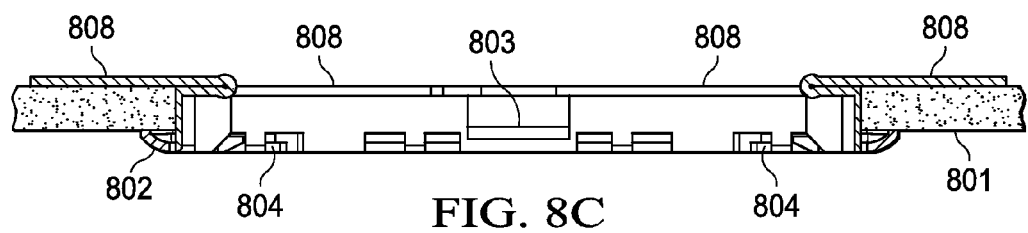

FIGS. 8A-8C illustrate another embodiment of a mounting plate 800 that can be coupled to the housing 301 of FIG. 3. This embodiment can be alternatively employed in those instances where an electrical wiring box is not present in the wall 801. This embodiment includes a flange 802, a electrical wiring block 803 and one or more latches 804, one or more test probe openings 805, one or more optional attachment openings 806 and a recess 807, similar to the previously described embodiment. In addition, however, this embodiment includes two or more oppositely disposed tabs 808 that are movably coupled to the mounting plate 800 at an inside edge 809 of the recess 807; that is, they are configured to move with respect to the mounting plate 800. Though the illustrated embodiment shows two tabs 808, it should be understood that other embodiments have include more or less than the illustrated number. FIG. 8B illustrates the mounting plate 800 positioned in an opening located in the wall 801 prior to the engagement of tabs 808, and FIG. 8C illustrates the mounting plate 800 after engagement of the tabs 808 against an inside face of the wall 801. In this particular embodiment, the tabs 808 may be made of a malleable material, such as thin sheet metal, that can easily be bent relative to the mounting plate 800 and against the inside face of the wall 801. The tabs 808 may either be integrally formed with the mounting plate 800, or they may be mechanically coupled to the mounting plate 800, which may be the case when the mounting plate 800 is comprised of a plastic or other composite material.

Figure 9A:
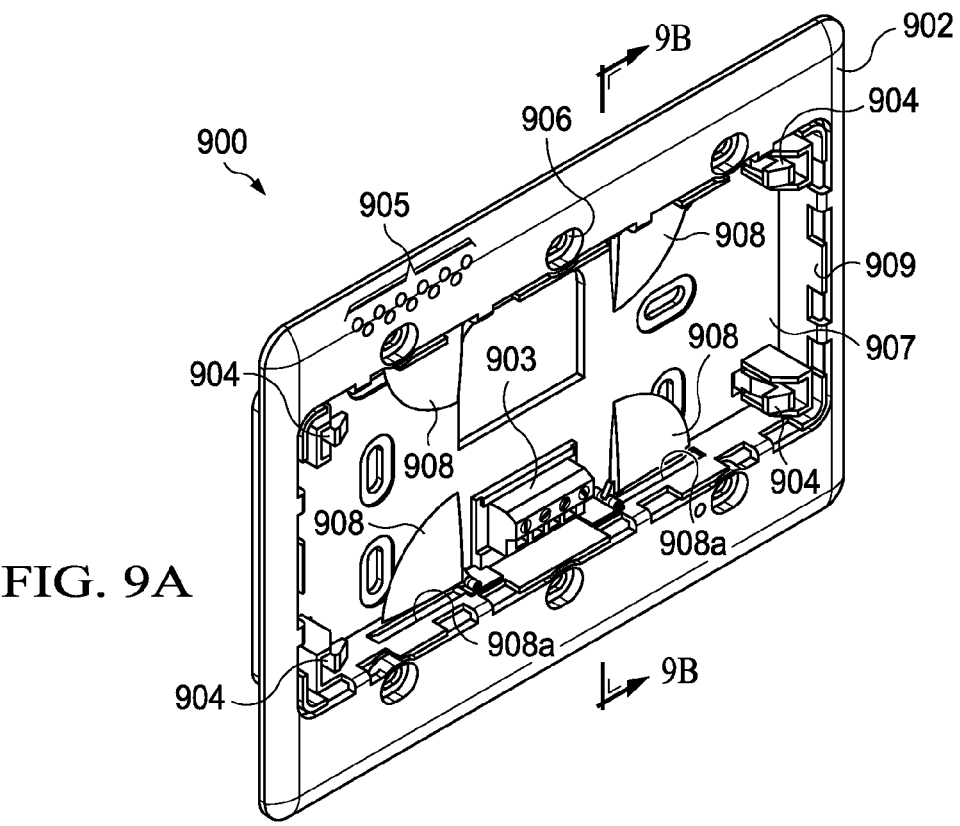
FIGS. 9A-9C illustrate another embodiment of a securing system for the mounting plate.
Figure 9B:
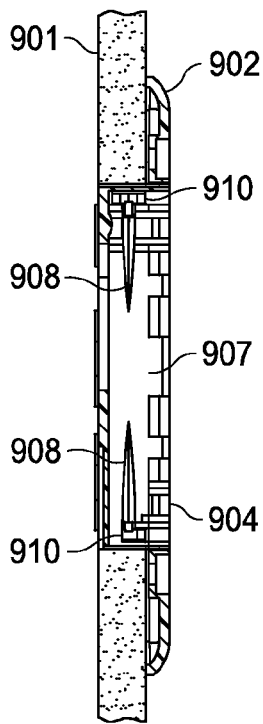
Figure 9C:
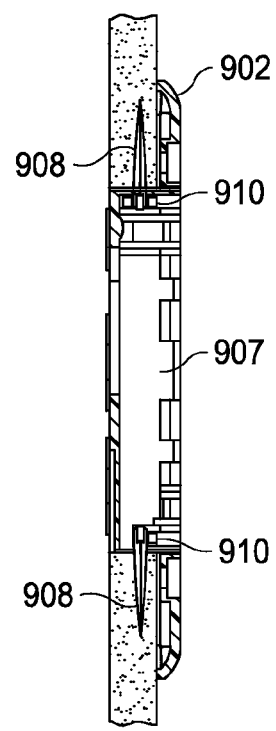

FIGS. 9A-9C illustrate another embodiment of a mounting plate 900 that can be coupled to the housing 301 for of FIG. 3. This embodiment can be alternatively employed in those instances where an electrical wiring box is not present in the wall 901. This embodiment includes a flange 902, a electrical wiring block 903 and one or more latches 904, one or more test probe openings 905, one or more optional attachment openings 906 and a recess 907, similar to the previously described embodiment. In addition, however, this embodiment includes two or more oppositely disposed tabs 908 that are movably coupled to the mounting plate 900 at an inside edge 909 of the recess 907; that is, in this embodiment, they are configured to rotate with respect to the mounting plate 900. Though the illustrated embodiment shows four tabs 908, it should be understood that other embodiments have include more or less than the illustrated number. The tabs 908 may be hinged to the mounting plate 900 in a manner that allow the tabs to rotate through elongated tab slots 908*a* and into the edges of the opening in the wall 901. FIG. 9B illustrates a sectional view of the mounting plate 900 positioned in an opening located in the wall 901 prior to the engagement of tabs 908 taken along the line 9B-9B, and FIG. 9C illustrates a sectional view of the mounting plate 900 after engagement of the tabs 908. As seen the tabs 908 have cut into the wall material, thereby anchoring the mounting plate 900 onto the wall 901. In this particular embodiment, the tabs 908 may be made of a sturdy material, such as metal, that has a sharp edge that will allow it to rotate and cut into the material of which the wall 901 is comprised. The tabs 908 may be mechanically coupled to the mounting plate 900 with a pin and block 910 that allows the tabs 908 to rotate with respect to the mounting plate 900.

Figure 10A:
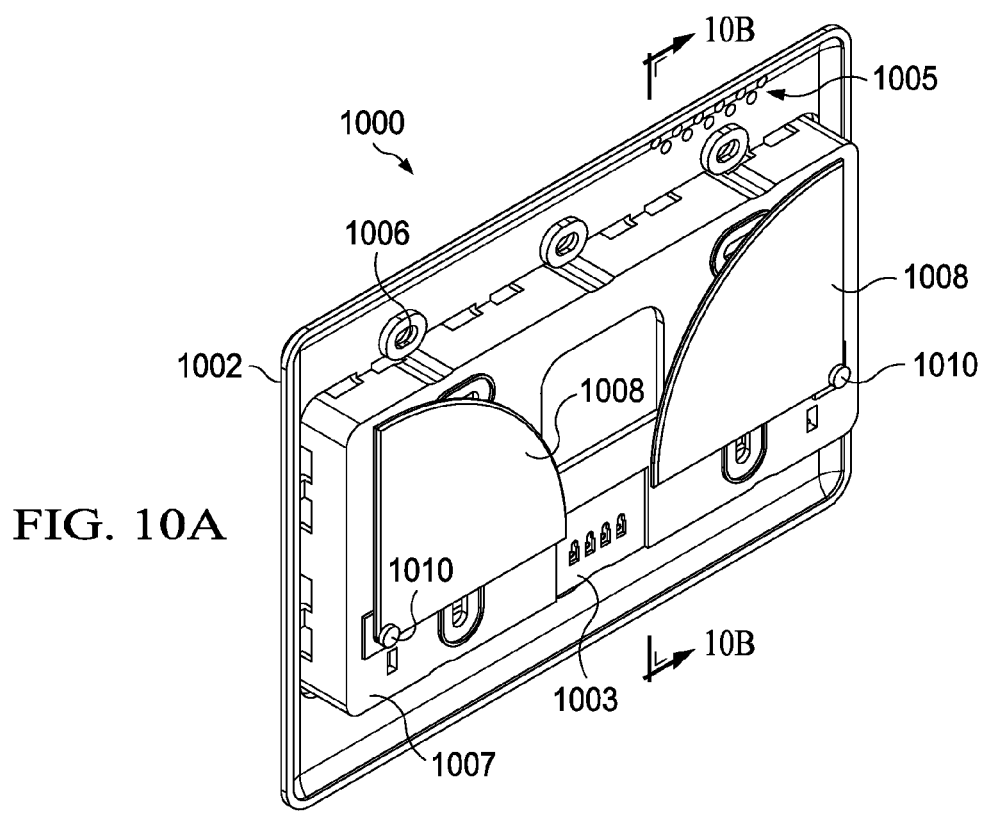
FIGS. 10A-10C illustrate another embodiment of a securing system for the mounting plate.
Figure 10B:
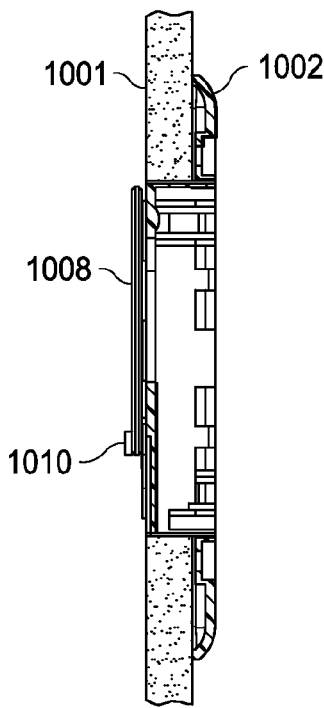
Figure 10C:
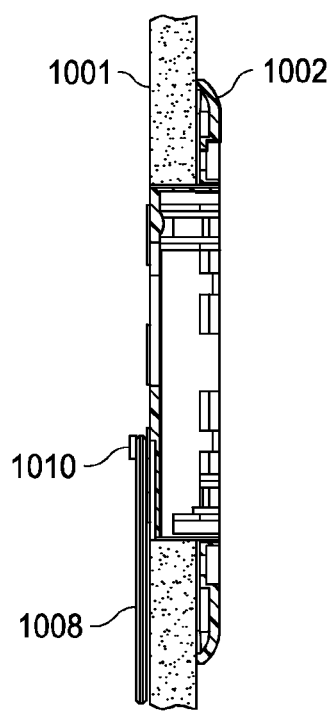

FIGS. 10A-10C illustrate another embodiment of a mounting plate 1000 that can be coupled to the housing 301 of FIG. 3. This embodiment can be alternatively employed in those instances where an electrical wiring box is not present in the wall 1001. This embodiment includes a flange 1002, a electrical wiring block 1003 and one or more latches (not shown), one or more test probe openings 1005, one or more optional attachment openings 1006 and a recess that causes a raised back portion 1007, similar to the previously described embodiments. In addition, however, this embodiment includes two or more oppositely disposed tabs 1008 that are movably coupled to the mounting plate 1000 on the face of the raised back portion 1007; that is, in this embodiment, they are configured to rotate with respect to the mounting plate 1000. Though the illustrated embodiment shows two tabs 1008, it should be understood that other embodiments have include more or less than the illustrated number. The tabs 1008 may be hinged to the mounting plate 1000 in a manner that allow the tabs 1008 to rotate outwardly from the mounting plate 1000 and frictionally engage the inside face of the wall 1001 to hold the mounting plate 1000 securely against the wall 1001. FIG. 10B illustrates a sectional view of the mounting plate 1000 positioned in an opening located in the wall 1001 prior to the engagement of tabs 1008 taken along the line 10B-10B, and FIG. 10C illustrates a sectional view of the mounting plate 1000 after engagement of the tabs 1008. As seen the tabs 1008 have been rotated such that they engage the inside face of the wall 1001, thereby anchoring the mounting plate 1000 onto the wall 1001. In this particular embodiment, the tabs 1008 may be made of a sturdy material, such as metal or hard plastic. The tabs 1008 may be mechanically coupled to the mounting plate 1000 with a pin and block 1010 that allows them to rotate with respect to the mounting plate 1000.

FIGS. 11A-11C illustrate another embodiment of a mounting plate 1100 that can be coupled to the housing 301 of FIG. 3. This embodiment can be alternatively employed in those instances where an electrical wiring box is not present in the wall 1101. This embodiment includes a flange 1102, a electrical wiring block 1103 and one or more latches 1104, one or more test probe openings 1105, one or more optional attachment openings 1106 and a recess 1107 that forms a raised portion 1107a on the back side of the mounting plate 1100, similar to the previously described embodiment. In addition, however, this embodiment includes two or more oppositely disposed tabs 1108 that are movably coupled to the mounting plate 1100 on the back side of the mounting plate 1100; that is, in this embodiment, they are configured to slidably move within a track 1108a that is coupled to the mounting plate 1100 and relative to the mounting plate 1100. Though the illustrated embodiment shows four tabs 1108, other embodiments may include more or less than this number. FIG. 11B illustrates the mounting plate 1100 positioned in an opening located in the wall 1101 prior to the engagement of tabs 1108, and FIG. 11C illustrates the mounting plate 1100 after engagement of the tabs 1108 against an inside face of the wall 1101. As seen, the tabs 1008 have been slid within the tracks 1008a such that they engage the inside face of the wall 1101, thereby anchoring the mounting plate 1100 onto the wall 1101. In this particular embodiment, the tabs 1108 may be made of a sturdy material, such as metal or hard plastic. The tracks 1108a may either be integrally formed with the mounting plate 1100, or they may be mechanically coupled to the mounting plate 110, which may be the case when the mounting plate 1100 is comprised of a plastic or other composite material. The tabs 1108 are slidably captured within the tracks 1108a.

Figure 12A:
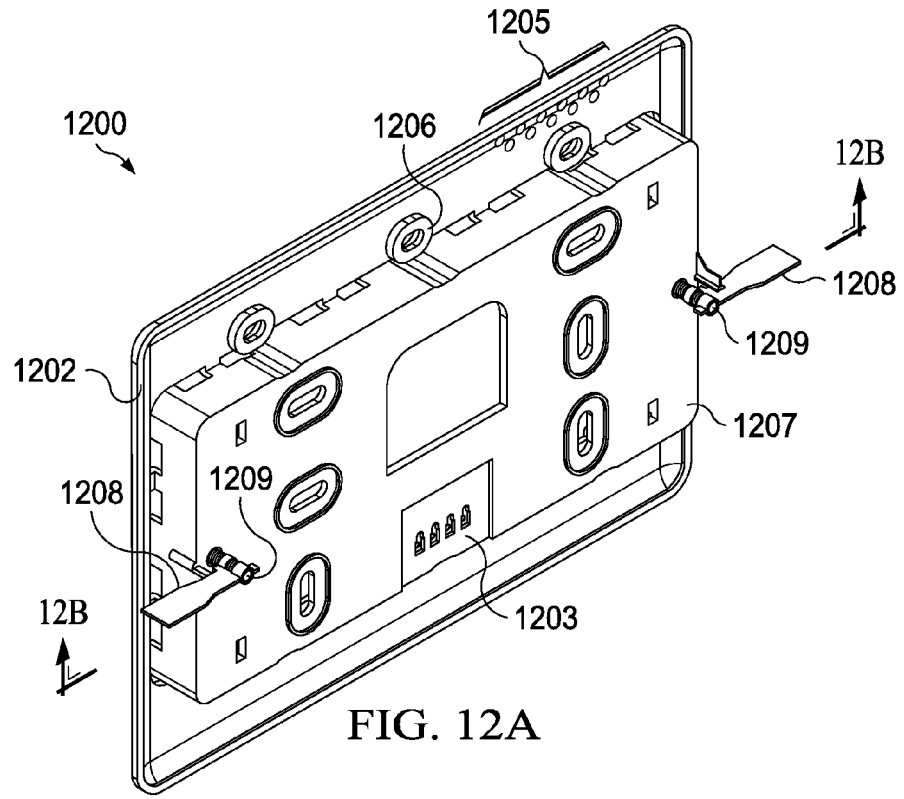
FIGS. 12A-12C illustrate another embodiment of a securing system for the mounting plate.
Figure 12B:
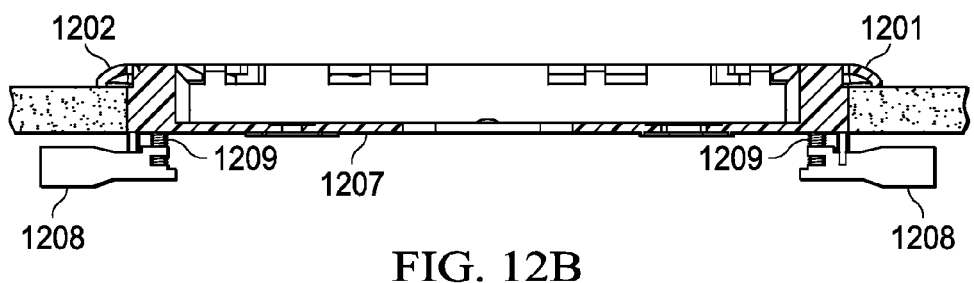
Figure 12C:
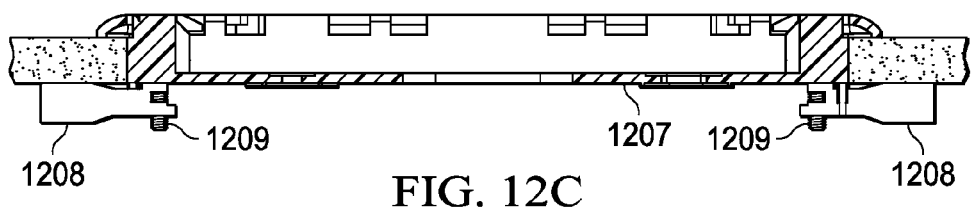

FIGS. 12A-12C illustrate another embodiment of a mounting plate 1200 that can be coupled to the housing 301 of FIG. 3. This embodiment can be alternatively employed in those instances where an electrical wiring box is not present in the wall 1201. This embodiment includes a flange 1202, a electrical wiring block 1203 and one or more latches (not shown), one or more test probe openings 1205, one or more optional attachment openings 1206 and a recess that results in a raised back portion 1207, similar to the previously described embodiments. In addition, however, this embodiment includes two or more oppositely disposed tabs 1208 that are movably coupled to the mounting plate 1200 at the raised back portion 1207; that is, in this embodiment, they are configured to receive a screw 1209 therethrough that when the screw 1209 is turned in the appropriate direction, the tabs 1208 are pulled against an abutting wall 1201. Though the illustrated embodiment shows two tabs 1208, it should be understood that other embodiments may include more or less than the illustrated number. The tabs 1208 can be positioned such that they extend in a lateral direction and behind the wall 1201, as shown, such that they can be pulled or tightened against the inside of the wall 1201 when the screw 1209 is turned in the appropriate direction and engage the inside face of the wall 1201 to hold the mounting plate 1200 securely against the wall 1201. FIG. 12B illustrates a sectional view of the mounting plate 1200 positioned in an opening located in the wall 1201 prior to the engagement of tabs 1208, and FIG. 12C illustrates a sectional view of the mounting plate 1200 after engagement of the tabs 1208. As seen the screws 1209 have been rotated to secure the tabs 1208 against the inside face of the wall 1201, thereby anchoring the mounting plate 1200 to the wall 1201. In this particular embodiment, the tabs 1208 may be made of a sturdy material, such as metal or hard plastic. The tabs 1208 may be mechanically coupled to the mounting plate 1200 by way of the screw 1209.

Those skilled in the art to which this application relates will appreciate that other and further additions, deletions, substitutions and modifications may be made to the described embodiments.

What is claimed is:

1. A heating ventilation air conditioning (HVAC) thermostat controller, comprising:
a mounting plate having front and back sides, said front side being defined by a recess having a geometric shape and formed therein and a wall covering flange extending around a perimeter of said recess and further comprising an electrical block pin connector located and fixed within said recess and extending outwardly from said front side of said recess, said back side being defined by a raised surface geometrically corresponding to said geometric shape of said recess; and
a controller housing having a front panel having an outer edge oriented toward a rear of said controller housing and with vents located therein and that includes a display screen, and a back panel coupled to said front panel and having and outer edge, oriented toward a front of said controller housing and with vents located therein, wherein said outer edges of said front panel and said back panel oppose each other when said front panel and said back panel are coupled together and wherein an exterior surface of said back panel has a raised surface that has a geometric shape that corresponds to a geometric shape of said recess and is configured to be received within said recess of said mounting plate, such that said vents of said outer edges of said front and back panels are uncovered when said back panel is received with said recess of said mounting plate, said back panel further including an electrical block pin connector affixed thereto and configured to cooperatively engage said electrical block pin connector of said separate mounting plate to provide an electrical connection between said mounting plate and said controller housing.

2. The HVAC controller recited in claim 1, wherein said raised surface of said back side of said controller includes one or more latch openings located in said raised surface of said back side and said mounting plate comprises one or more latches located in said recess configured to be received and latachably engaged in said one or more latch openings.

3. The HVAC controller recited in claim 1, further including movable tabs coupled at said back side of said mounting plate and comprised of a malleable material that allows said tabs to be bent against an inside face of said wall and secure said mounting plate to said wall.

4. The HVAC controller recited in claim 1, further including movable tabs rotatably coupled to said mounting plate and said mounting plate further includes elongated slots located on opposing sides of an inside edge of said recess and wherein said tabs are coupled to said mounting plate with a pin and are configured to rotate through said elongated slots and into an edge of said opening in said wall.

5. The HVAC controller recited in claim 1, further including movable tabs rotatably coupled to said back side of said mounting plate by a pin and configured to rotate in opposing directions and against an inside face of said wall.

6. The HVAC controller recited in claim 1, further including movable tabs wherein said movable tabs are opposing slidable plates located on said back side of said mounting plate and each slidably captured within a track, said movable tabs configured to slide within said track and against an inside face of said wall.

7. The HVAC controller recited in claim 1, further including movable tabs, wherein said movable tabs are threadably couplable to said back side of said mounting plate with a screw and configured to exert a securing force against an inside face of said wall when said screw is rotated with respect to said mounting plate.

8. The HVAC controller recited in claim 1, wherein said wall covering flange of said mounting plate includes mounting openings therein.

9. The HVAC controller recited in claim 8, wherein said mounting openings are positioned about said wall covering flange such that said mounting plate are attachable to an electrical connection box.

10. The HVAC controller recited in claim 1, wherein a perimeter of said raised portion on said back panel is smaller than a perimeter of said back panel.

11. The HVAC controller recited in claim 1 wherein said electronic components are located on a printed wiring board (PWB) within said housing.

12. The HVAC controller recited in claim 1, said front panel includes a screen opening and wherein said electronic components includes a touch screen control panel exposed by said screen panel opening.

13. The HVAC controller recited in claim 1 wherein said back panel has a plurality of testing probe holes that align with a testing contact pad of said electrical components within said controller housing to allow a testing probe to be inserted through at least one of said plurality of testing probe holes to test said electrical components.

* * * * *